(12) United States Patent
Tsubonoya et al.

(10) Patent No.: US 12,025,779 B2
(45) Date of Patent: Jul. 2, 2024

(54) OPTICAL SYSTEM, OPTICAL EQUIPMENT, AND MANUFACTURING METHOD FOR OPTICAL SYSTEM

(71) Applicant: Nikon Corporation, Tokyo (JP)

(72) Inventors: Keisuke Tsubonoya, Yokohama (JP); Hiroki Harada, Zushi (JP); Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 830 days.

(21) Appl. No.: 17/059,466

(22) PCT Filed: May 29, 2018

(86) PCT No.: PCT/JP2018/020552
§ 371 (c)(1),
(2) Date: Nov. 29, 2020

(87) PCT Pub. No.: WO2019/229849
PCT Pub. Date: Dec. 5, 2019

(65) Prior Publication Data
US 2021/0208373 A1    Jul. 8, 2021

(51) Int. Cl.
G02B 13/18    (2006.01)
G02B 3/12    (2006.01)
G02B 27/00    (2006.01)

(52) U.S. Cl.
CPC ............... *G02B 13/18* (2013.01); *G02B 3/12* (2013.01); *G02B 27/005* (2013.01)

(58) Field of Classification Search
CPC .......... G02B 3/12; G02B 13/18; G02B 13/04; G02B 27/005; G02B 9/64
See application file for complete search history.

(56) References Cited

U.S. PATENT DOCUMENTS

| 2005/0013014 A1 | 1/2005 | Mizuguchi et al. |
| 2005/0157405 A1 | 7/2005 | Mizuguchi et al. |
| 2007/0115559 A1 | 5/2007 | Mizuguchi et al. |

(Continued)

FOREIGN PATENT DOCUMENTS

| CN | 1495464 A | 5/2004 |
| EP | 3252518 A1 | 6/2017 |

(Continued)

OTHER PUBLICATIONS

Office Action dated Sep. 7, 2021, in Japanese Patent Application No. 2020-522432.

(Continued)

*Primary Examiner* — Marin Pichler
*Assistant Examiner* — Justin W. Hustoft
(74) *Attorney, Agent, or Firm* — Potomac Law Group, PLLC

(57) ABSTRACT

An optical system comprises, in order from an object side, a front group having positive refractive power and a rear group. Upon carrying out focusing, the front group is moved along the optical axis. A predetermined conditional expression is satisfied. Thus, an optical system having a superb optical performance being able to correct superbly various aberrations and being suitable to be used with an imaging device having highly increased number of pixels, an optical equipment equipped therewith and a manufacturing method for the optical system are provided.

20 Claims, 10 Drawing Sheets

(56) References Cited

U.S. PATENT DOCUMENTS

| | | | |
|---|---|---|---|
| 2008/0309815 A1 | 12/2008 | Nanjo et al. | |
| 2010/0220229 A1 | 9/2010 | Sano | |
| 2013/0088635 A1 | 4/2013 | Sano | |
| 2013/0229567 A1 | 9/2013 | Sano | |
| 2015/0160443 A1* | 6/2015 | Kanda | G02B 15/1421 359/691 |
| 2016/0131878 A1 | 5/2016 | Nomura | |
| 2016/0147042 A1 | 5/2016 | Sun | |
| 2018/0067333 A1 | 3/2018 | Ishibashi | |

FOREIGN PATENT DOCUMENTS

| | | |
|---|---|---|
| JP | S61-238010 A | 10/1986 |
| JP | H03-141313 A | 6/1991 |
| JP | 11-211978 A | 8/1999 |
| JP | 2008-309998 A | 12/2008 |
| JP | 2010-032783 A | 2/2010 |
| JP | 2010-224521 A | 10/2010 |
| JP | 2012-203234 A | 10/2012 |
| JP | 2014-092681 A | 5/2014 |
| JP | 2015-004717 A | 1/2015 |
| JP | 2016-099552 A | 5/2016 |
| JP | 2017-009644 A | 1/2017 |
| JP | 2018-040858 A | 3/2018 |
| WO | WO 2016/121945 A1 | 8/2016 |

OTHER PUBLICATIONS

Office Action dated Nov. 17, 2021, in Chinese Patent Application No. 201880093788.1.
International Search Report from International Patent Application No. PCT/JP2018/020552, dated Sep. 4, 2018.
Office Action dated Apr. 14, 2022, in Chinese Patent Application No. 201880093788.1.
Office Action dated May 31, 2022, in Japanese Patent Application No. 2020-522432.
Office Action dated Jul. 12, 2022, in Chinese Patent Application No. 201880093788.1.

* cited by examiner

Fig.2
Fig.2A
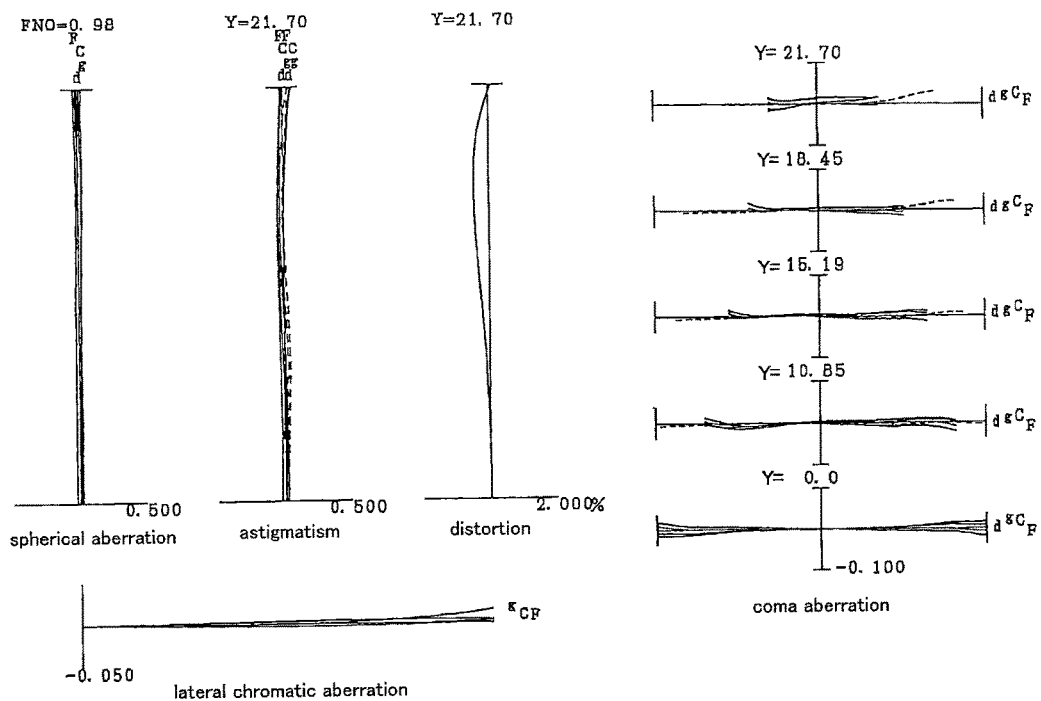
Fig.2B
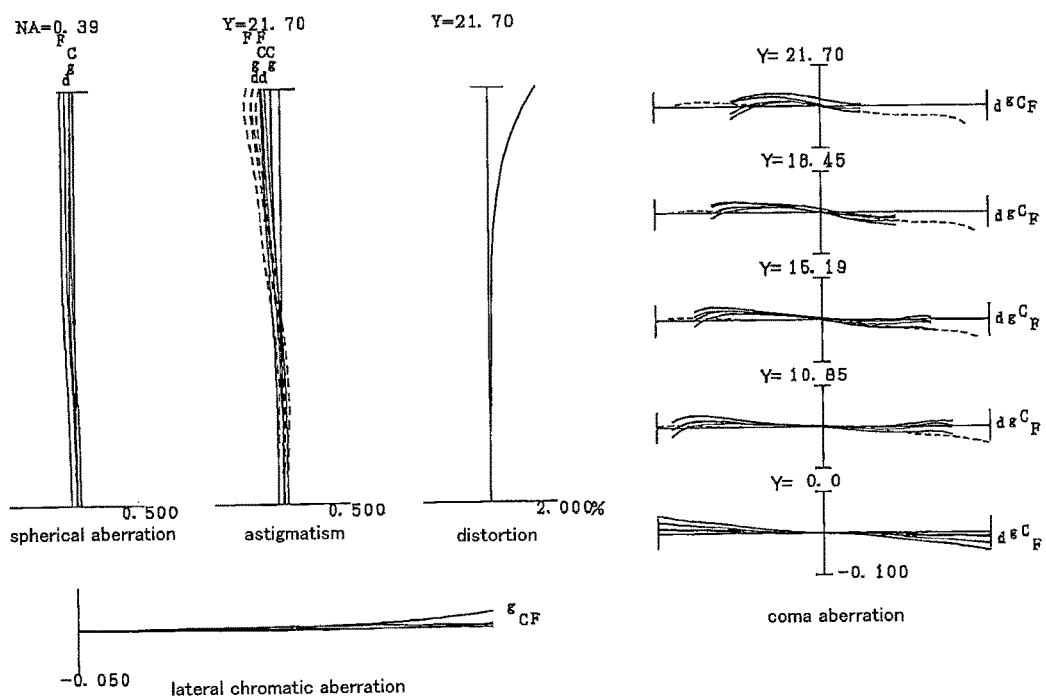

Fig.4
Fig.4A
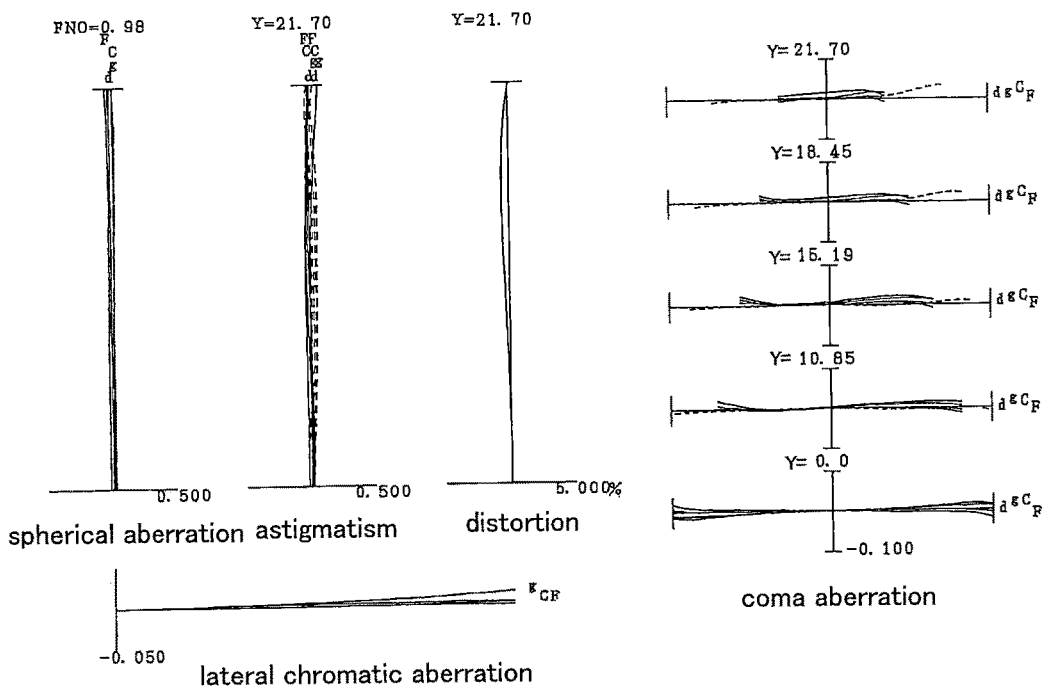
Fig.4B
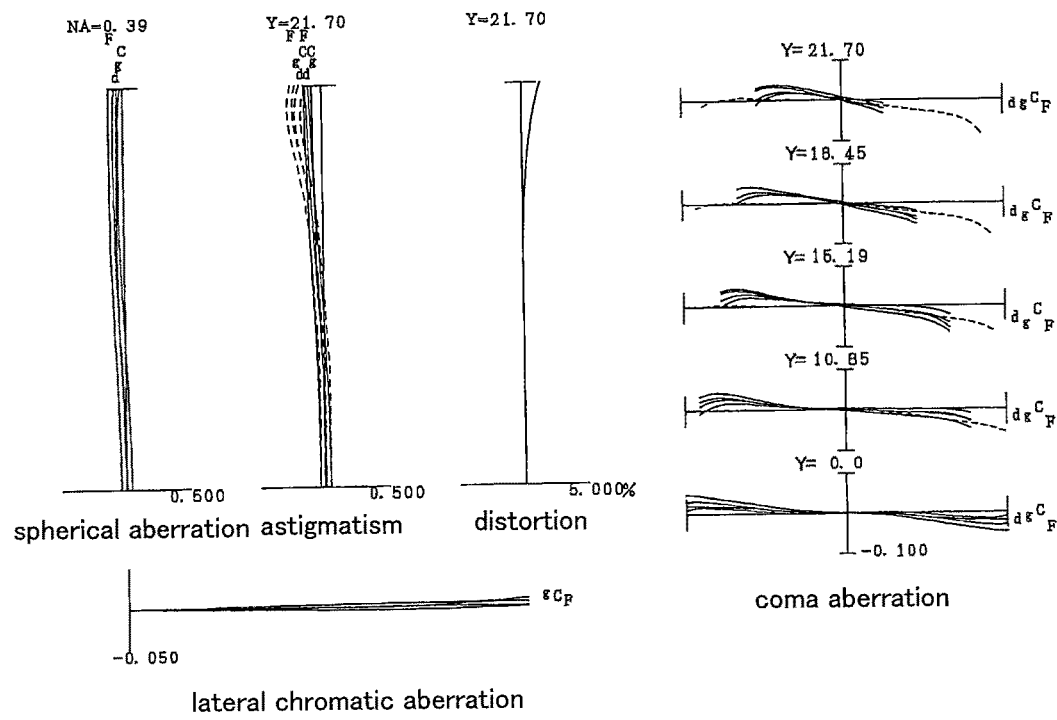

Fig.6
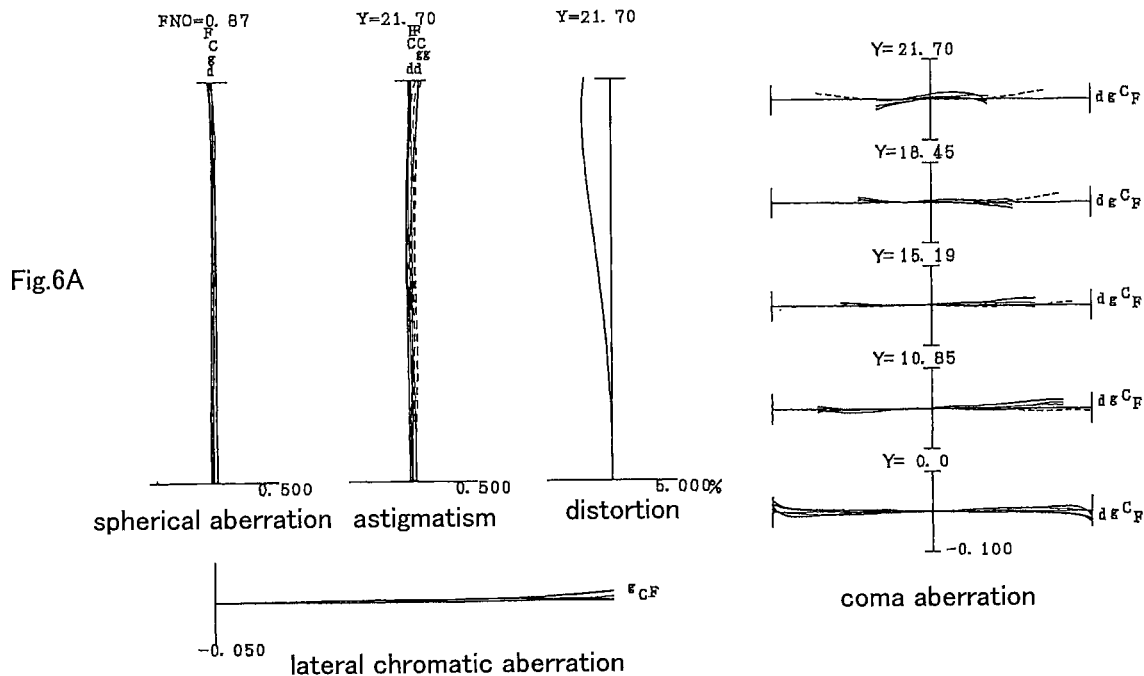
Fig.6A
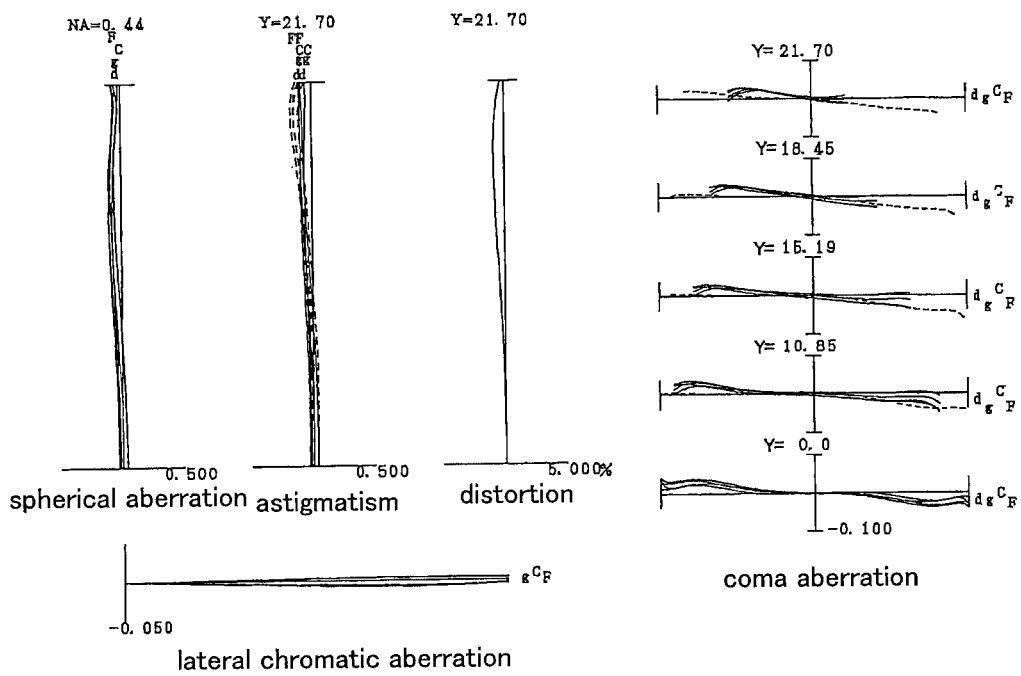
Fig.6B

Fig.8
Fig.8A
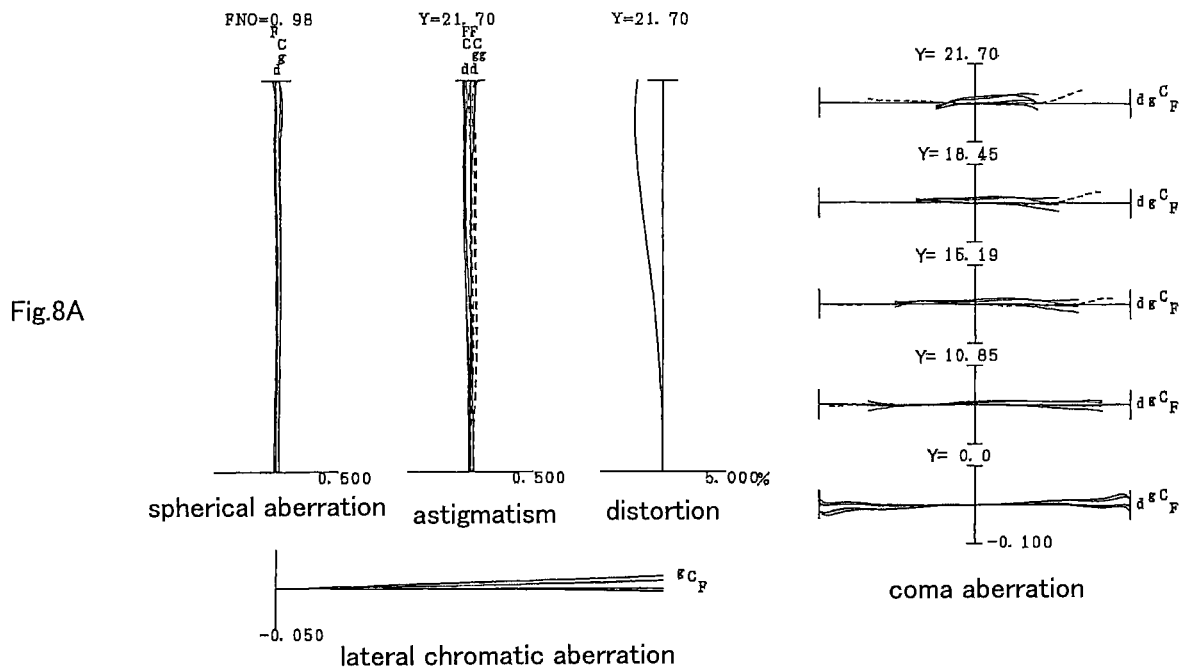
Fig.8B
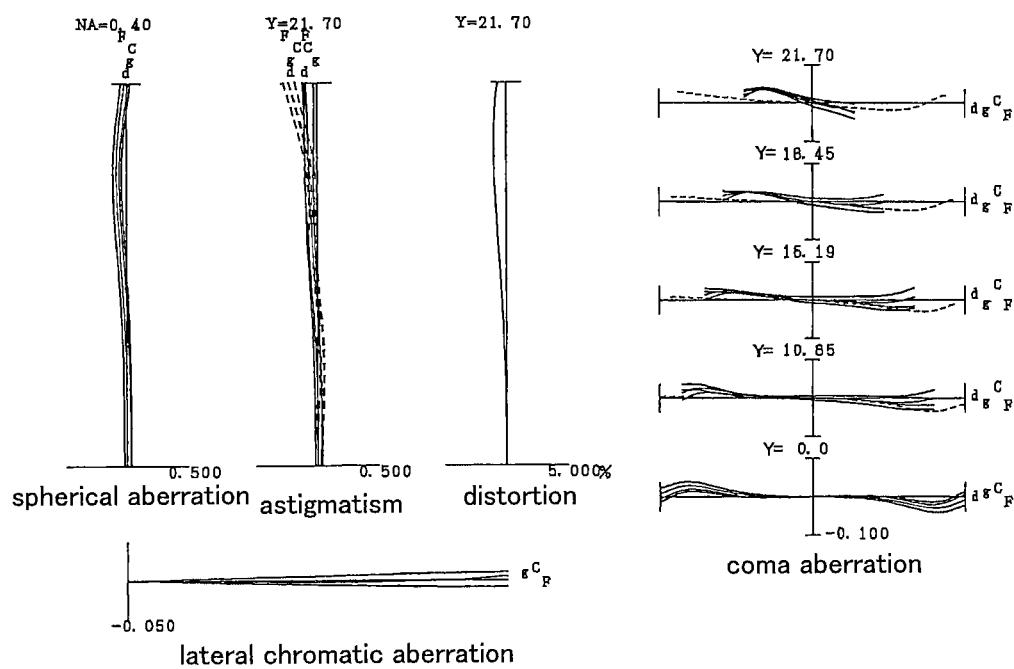

OPTICAL SYSTEM, OPTICAL EQUIPMENT, AND MANUFACTURING METHOD FOR OPTICAL SYSTEM

TECHNICAL FIELD

The present invention relates to an optical system, an optical equipment and a manufacturing method for the optical system.

BACKGROUND ART

Conventionally, it has been known, in a photographing lens having a large diameter, that various aberrations are corrected by adding a lens to a double Gaussian lens system (For example, refer to Japanese Patent Application Laid Open No. He 11-211978). However, a photographing lens having a large diameter, which can correct further superbly various aberrations, has been desired in accordance with highly increasing in number of pixels of imaging devices in recent years.

PRIOR ART REFERENCE

Patent Document 1: Japanese Patent Application Laid-Open Gazette No. He 11-211978.

SUMMARY OF THE INVENTION

According to a first aspect of the present invention, there is provided an optical system consisting of, in order from an object side, a front group having positive refractive power, and a rear group;
upon carrying out focusing, said front group being moved along the optical axis; and
the following conditional expression being satisfied:

$$0.90 < fF/f < 1.50$$

where fF denotes a focal length of said front group; and f denotes a focal length of the whole of said optical system.

Further, according to a second aspect of the present invention, there is provided a manufacturing method for an optical system consisting of, in order from an object side, a front group having positive refractive power and a rear group; comprising the steps of:
configuring such that, upon carrying out focusing, said front group is moved along the optical system; and
configuring such that the following conditional expression is satisfied:

$$0.90 < fF/f < 1.50$$

where fF denotes a focal length of said front group; and f denotes a focal length of the whole of said optical system.

BRIEF DESCRIPTION OF THE DRAWINGS

FIG. 2A and FIG. 2B are, respectively, graphs showing various aberrations upon focusing on an infinitely distant object and upon focusing on a close distance object, of the optical system according to the First Example.

FIG. 4A and FIG. 4B are, respectively, graphs showing various aberrations upon focusing on an infinitely distant object and upon focusing on a close distance object, of the optical system according to the Second Example.

FIG. 6A and FIG. 6B are, respectively, graphs showing various aberrations upon focusing on an infinitely distant object and upon focusing on a close distance object, of the optical system according to the Third Example.

FIG. 8A and FIG. 8B are, respectively, graphs showing various aberrations upon focusing on an infinitely distant object and upon focusing on a close distance object, of the optical system according to the Fourth Example.

EMBODIMENTS FOR CARRYING OUT THE INVENTION

Figure 1:
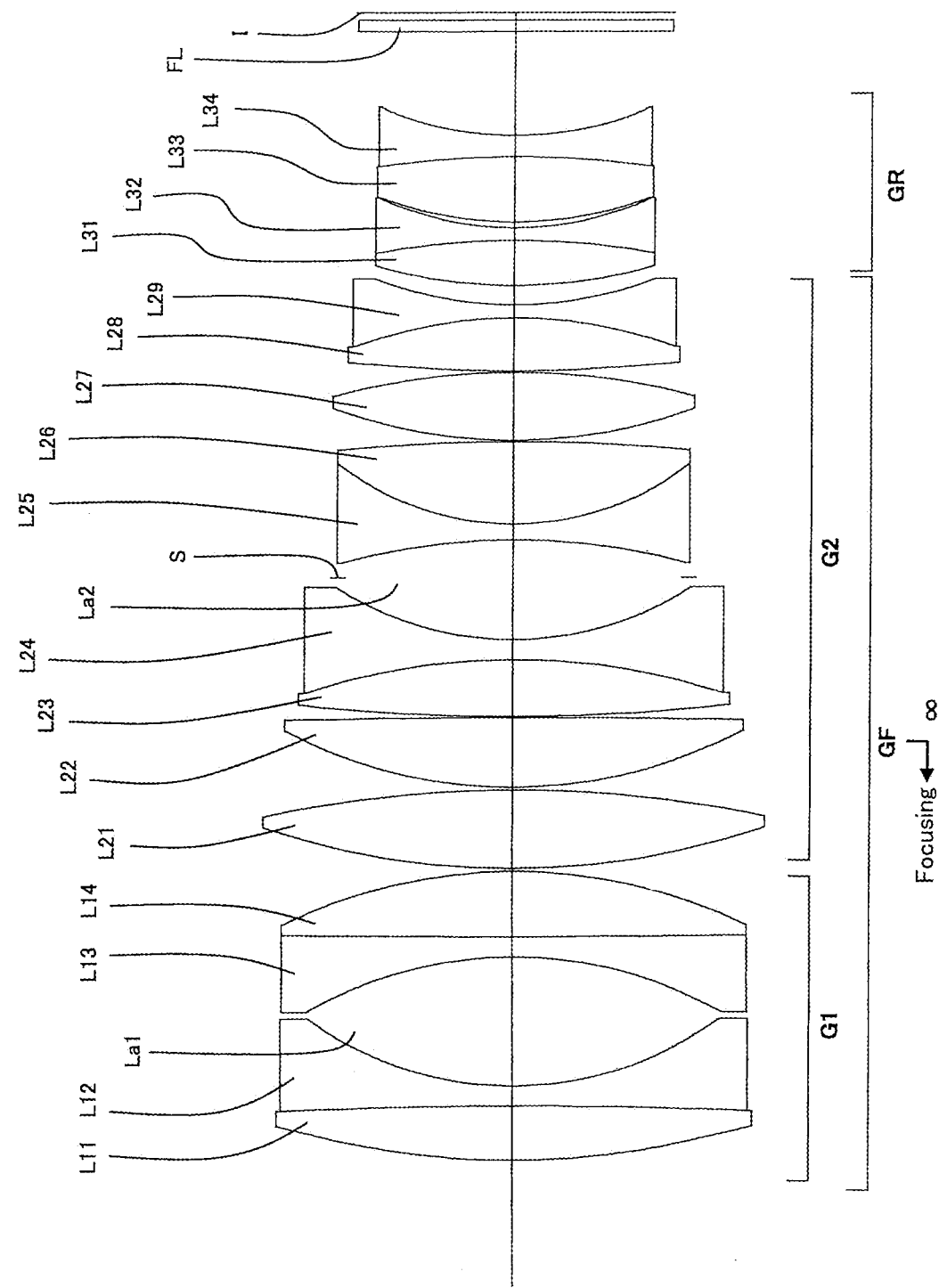
FIG. 1 is a sectional view showing an optical system according to a First Example.

Next, an optical system, an optical equipment and a manufacturing method for the optical system according to an embodiment of the present invention, will be explained.

The optical system according to the present embodiment is composed of, in order from an object side, a front group having positive refractive power, and a rear group;
upon carrying out focusing, said front group being moved along the optical axis; and
the following conditional expression (1) being satisfied;

$$0.90 < fF/f < 1.50 \quad (1)$$

where fF denotes a focal length of said front group; and f denotes a focal length of the whole of said optical system.

In an optical system according to the present embodiment, which consists of, in order from an object side, a front group having positive refractive power and a rear group, and which is configured such that, upon carry out focusing, said front group is moved along the optical axis, thereby it being possible to suppress variations in various aberrations upon carrying out focusing from an infinitely distant object to a close distance object, and in particular to correct superbly spherical aberration and curvature of field.

The conditional expression (1) defines a ratio of a focal length of the front group to a focal length of the whole of the optical system. The optical system according to the present embodiment can suppress various aberrations including spherical aberration and curvature of field superbly by satisfying the conditional expression (1).

When the value of fF/f in the conditional expression (1) is equal to or exceeds the upper limit value, refractive power of the front group becomes weak and it becomes impossible to correct sufficiently curvature of field. Meanwhile, if the upper limit value of the conditional expression (1) is set to 1.48, the advantageous effect of the present embodiment can be secured more surely. In order to secure the advantageous effect of the present embodiment further more surely, it is preferable to set the upper limit value of the conditional expression (1) to 1.46, 1.45, 1.43, 1.42 and further to 1.40.

On the other hand, when the value of fF/f is equal to or falls below the lower limit of the conditional expression (1), refractive power of the front group becomes strong and it becomes impossible to correct sufficiently spherical aberration. Meanwhile, if the lower limit value of the conditional expression (1) is set to 0.95, the advantageous effect of the present embodiment can be secured more surely. In order to secure the advantageous effect of the present embodiment further more surely, it is preferable to set the lower limit value of the conditional expression (1) to 1.00, 1.03, 1.05, 1.08, 1.10, 1.13, 1.15, 1.18 and further 1.20.

According to the above described configuration, it is possible to realize an optical system which has excellent optical performance(s) that various aberrations can be superbly corrected, and which is suitable to be used for an imaging device in which the number of pixels having highly increased number of pixels.

Further, it is desirable that, in the optical system according to the present embodiment, said front group comprises at least two convex-shaped air lenses, and one of said air lenses, which has a longest length on the optical axis in said air lenses, satisfies the following conditional expression:

$$-1.00 < (r2L1 + r1L1)/(r2L1 - r1L1) < 3.00 \qquad (2)$$

where r1L1 denotes a curvature radius of an object side lens surface of said air lens which has the longest length on the optical axis, and r2L1 denotes a curvature radius of an image side lens surface of said air lens which has the longest length on the optical axis.

The conditional expression (2) is a conditional expression for defining a shape factor of said at air lens which has the longest length on the optical axis in said air lenses. With satisfying the conditional expression (2), it is possible to correct superbly various variations and attain superb optical performance.

Meanwhile, "air lens" means a lens that is formed by an air portion between a lens and a lens neighboring to each other.

When the value of (r2L1+r1L1)/(r2L1−r1L1) is equal to or exceeds the upper limit value of the conditional expression (2), a shape of the air lens becomes disadvantageous with respect to peripheral light flux, so it becomes difficult to correct distortion and curvature of field.

Meanwhile, if the upper limit value of the conditional expression (2) is set to 2.90, the advantageous effect of the present embodiment can be secured more surely. In order to secure the advantageous effect of the present embodiment furthermore surely, it is preferable to set the upper limit value of the conditional expression (2) to 2.80, 2.70, 2.60, 2.50, 2.40, 2.30 and further 2.20.

On the other hand, when the value of (r2L1+r1L1)/(r2L1−r1L1) is equal to or falls below the lower limit value of the conditional expression (2), high order spherical aberration is apt to be generated, and it becomes difficult to correct various aberrations such as spherical aberration. Meanwhile, if the lower limit value of the conditional expression (2) is set to −0.08, the advantageous effect of the present embodiment can be secured more surely. Further, in order to secure the advantageous effect of the present embodiment more surely, it is preferable to set the lower limit value of the conditional expression (2) to −0.05, −0.03, −0.01, 0.01, and further 0.02.

Further, it is desirable that, in the optical system according to the present embodiment, said front group comprises at least two convex-shaped air lenses, and one of said air lenses, which has a second longest length on the optical axis, satisfies the following conditional expression (3):

$$-2.00 < (r2L2 + r1L2)/(r2L2 - r1L2) < 2.00 \qquad (3)$$

where r1L2 denotes a curvature radius of an object side lens surface of said air lens which has the second longest length on the optical axis, and r2L2 denotes a curvature radius of an image side lens surface of said air lens which has the second longest length on the optical axis.

The conditional expression (3) is a conditional expression for defining a shape factor of said air lens which has the second longest length on the optical axis in said air lenses. With satisfying the conditional expression (3), it is possible to correct superbly various variations and attain superb optical performance.

When the value of (r2L2+r1L2)/(r2L2−r1L2) is equal to or exceeds the upper limit value of the conditional expression (3), a shape of that air lens becomes disadvantageous with respect to peripheral light flux, so it becomes difficult to correct distortion and curvature of field.

Meanwhile, if the upper limit value of the conditional expression (3) is set to 1.90, the advantageous effect of the present embodiment can be secured more surely. In order to secure the advantageous effect of the present embodiment further more surely, it is preferable to set the upper limit value of the conditional expression (3) to 1.80, 1.70, 1.60, 1.50, 1.40, 1.30, 1.20 and further 1.10.

On the other hand, when the value of (r2L2+r1L2)/(r2L2−r1L2) is equal to or falls below the lower limit value of the conditional expression (3), high order spherical aberration is apt to be generated, and it becomes difficult to correct various aberrations such as spherical aberration. Meanwhile, if the lower limit value of the conditional expression (3) is set to −1.90, the advantageous effect of the present embodiment can be secured more surely. Further, in order to secure the advantageous effect of the present embodiment more surely, it is preferable to set the lower limit value of the conditional expression (3) to −1.80, −1.70, −1.60, −1.50, −1.30, −1.20 and further to −1.10.

Further, it is desirable that, in the optical system according to the present embodiment, said front group comprises at least one negative lens that satisfies the following conditional expression:

$$\theta gFLn + 0.0021 \times vdLn < 0.670 \qquad (4)$$

where vdLn denotes Abbe number of said negative lens for d-line, and θgFLn denotes a partial. dispersion ratio of said negative lens between g-line and F-line.

Here, the Abbe number vdLn and the partial dispersion ratio θgFLn are respectively expressed by the formulae as below:

$$vdLn = (nd - 1)/(nF - nC)$$

$$\theta gFLn = (ng - nF)/(nF - nC),$$

where refractive index for C-line (wave length 656.3 nm) is nC, refractive index for d-line (wave length 587.6 nm) is nd, refractive index for F-line (wave length 486.1 nm) is nF, and refractive index for g-line (wave length 435.8 nm) is ng.

The conditional expression (4) is a conditional expression for defining a glass material used for the negative lens included in said front group. With said front group including the negative lens satisfying the conditional expression (4), in addition to the first order achromatism, the second order spectral can be corrected sufficiently.

When the value of (θgFLn+0.0021×vdLn) is equal to or exceeds the upper limit value of the conditional expression (4), anomalous dispersion of said negative lens becomes large, and it becomes difficult to correct the second order spectral.

Meanwhile, if the upper limit value of the conditional expression (4) is set to 0.668, the advantageous effect of the present embodiment can be secured more surely. In order to secure the advantageous effect of the present embodiment further more surely, it is preferable to set the upper limit value of the conditional expression (4) to 0.667, 0.666, 0.665, 0.664, 0.663, 0.662, and further to 0.661.

In order to secure the advantageous effect of the present embodiment more and more surely, it is preferable that the conditional expression (4) satisfies the following relationship:

$$0.200 < \theta gFLn + 0.0021 \times vdLn.$$

When the value of (θgFLn+0.0021×vdLn) is equal to or falls below the lower limit value of the conditional expression (4), anomalous dispersion of said negative lens becomes small, and it becomes difficult to correct the second order spectral. Meanwhile, in order to secure the advantageous effect of the present embodiment further more surely, it is preferable to set the lower limit value of the conditional expression (4) to 0.250, 0.300, 0.350, and further to 0.400.

Further, it is desirable that, in the optical system according to the present embodiment, an image side lens surface of the lens located at the most image side is convexed toward the object side, thereby it being possible to correct superbly spherical aberration and curvature of field in the optical system whose numerical aperture is large.

Further, in the optical system according to the present embodiment, it is desirable that the following conditional expression (5) is satisfied:

$$1.50 < rc/bfa < 4.50 \qquad (5)$$

where rc denotes a curvature radius of the image side lens surface of the lens disposed at the most image side, and bfa denotes an air converted distance on the optical axis from the image side lens surface of the lens disposed at the most image side to the image plane.

The conditional expression (5) is a conditional expression that defines a ratio of the curvature radius of the image side lens surface of the lens disposed at the most image side to the air converted distance on the optical axis from the image side lens surface of the lens disposed at the most image side to the image plane. With satisfying the conditional expression (5), it is possible to correct superbly the spherical aberration and the curvature of field.

When the value of rc/bfa is equal to or exceeds the upper limit value of the conditional expression (5), an incident angle of the axial light ray relative to the normal line becomes large and it becomes difficult to correct spherical aberration. Meanwhile, by setting the upper limit value of the conditional expression (5) to 4.30, it is possible to ensure the advantageous effect of the present embodiment more surely. In order to make the advantageous effect of the present embodiment more surely, it is more preferable to set the upper limit value to 4.00, 3.80, 3.60, 3.50, 3.40, 3.35, 3.30 and further to 3.25.

On the other hand, when the value of rc/bfa is equal to or falls below the lower limit value of the conditional expression (5), the curvature of the image side surface of the lens disposed at the most image side becomes strong and it becomes difficult to correct the curvature of field. Meanwhile, by setting the lower limit value of the conditional expression (5) to 1.70, it becomes possible to attain the advantageous effect of the present embodiment more securely. Further, in order to attain the advantageous effect of the present embodiment further more surely, it is preferable to set the lower limit value of the conditional expression (5) to 1.80, 1.90, 2.00, 2.20, 2.40, 2.50 and further to 2.60.

Further, in the optical system according to the present embodiment, it is desirable that the following conditional expression (6) is satisfied:

$$0.80 < rA/TLA < 2.50 \qquad (6)$$

where rA denotes a curvature radius of an image side lens surface of the lens disposed at the most image side in said front group; and TLA denotes an air converted distance on the optical axis from the image side lens surface of the lens disposed at the most image side in said front group to the image plane, in the focusing state onto an infinitely distant object.

The conditional expression (6) is a conditional expression that defines a ratio of the radius of curvature of the image side lens surface of the lens disposed at the most image side in the front group to the air converted distance on the optical axis from the image side lens surface of the lens disposed at the most image side in said front group to the image plane, in the focusing state onto an infinitely distant object. With satisfying the conditional expression (6), it is possible to correct superbly the spherical aberration and curvature of field.

When the value of rA/TLA is equal to or exceeds the upper limit value of the conditional expression (6), an incident angle of an axial light ray relative to the normal line becomes large, and it becomes difficult to correct spherical aberration. Meanwhile, if the upper limit value of the conditional expression (6) is set to 2.40, the advantageously effect of the present embodiment can be secured more surely. Further, in order to attain the advantageous effect of the present embodiment further more surely, it is preferable to set the upper limit value of the conditional expression (6) to 2.30, 2.20, 2.10, 2.00, 1.90 and further to 1.80.

On the other hand, when the value of rA/TLA is equal to or falls below the lower limit value of the conditional expression (6), the curvature of the image side lens surface of the lens disposed at the most image side in said front group becomes strong or the height of the principle light ray becomes low, correction of the curvature of field becoming difficult. Meanwhile, by setting the lower limit value of the conditional expression (6) to 0.85, the advantageous effect of the present embodiment can be secured more surely. Further, in order to ensure the advantageous effect of the present embodiment further more surely, it is preferable to set the lower limit value of the conditional expression (6) to 0.90, 0.95, 1.00, 1.05, and further to 1.10.

Further, in the optical system according to the present embodiment, it is desirable that the following conditional expression (7) is satisfied:

$$1.20 < rB/TLB < 3.00 \qquad (7)$$

where rB denotes a curvature radius of an object side lens surface of the lens disposed at the most object side in said rear group; and TLB denotes an air converted distance on the optical axis from the object side lens surface of the lens disposed at the most object side in said rear group to the image plane, in the focusing state onto an infinitely distant object.

The conditional expression (7) defines a ratio of the radius of curvature of the object side lens surface of the lens disposed at the most object side in the rear group, relative to the air converted distance on the optical axis from the object side lens surface of the lens disposed at the most object side in said rear group to the image plane, in the state where an infinitely distant object is focused. With satisfying the conditional expression (7), it is possible to correct superbly the spherical aberration and curvature of field.

When the value of rB/TLB is equal to or exceeds the upper limit value of the conditional expression (7), an angle of incidence of an on-axis light ray relative to normal line becomes large and correction of spherical aberration would become difficult. Meanwhile, by setting the upper limit value of the conditional expression (7) to 2.90, the advantageous effect of the present embodiment can be secured more surely. Further, in order to ensure the advantageous effect of the present embodiment more surely, it is preferable to set the upper limit value of the conditional expression (7) to 2.80, 2.70, 2.60 and further to 2.55.

On the other hand, when the value of rB/TLB is equal to or falls below the lower limit value of the conditional expression (7), curvature of an object side lens surface of the lens disposed at the most object side in said rear group, becomes strong, or the height of the principal light ray becomes low, thereby correction of curvature of field becoming difficult. Meanwhile, by setting the lower limit value of the conditional expression (7) to 1.25, the advantageous effect of the present embodiment can be secured more surely. Further, in order to ensure the advantageous effect of the present embodiment more surely, it is preferable to set the lower limit value of the conditional expression (7) to 1.30, 1.35, 1.40, 1.45 and further to 1.50.

In the optical system according to the present embodiment, it is desirable that the following conditional expression (8) is satisfied:

$$-0.10 < f/fR < 0.30 \tag{8}$$

where f denotes a focal length of the whole of said optical system, and fR denotes a focal length of said rear group.

The conditional expression (8) is a conditional expression which defines the focal length of the whole of the optical system, relative to the focal length of the rear group. The optical system according to the present embodiment can suppress various aberrations including spherical aberration by satisfying the conditional expression (8). Meanwhile, said rear group may have positive refractive power or negative refractive power.

When the value of f/fR is equal to or exceeds the upper limit value of the conditional expression (8), an ability for correcting aberrations by the rear group becomes insufficient, and if it is intended to make exit pupil or amount of marginal light sufficient, it becomes necessary to make dimension in diametrical direction of the optical system larger. This is not desirable. Meanwhile, by setting the upper limit value of the conditional expression (8) to 0.29, the advantageous effect of the present embodiment can be secured more surely. Further, in order to ensure the advantageous effect of the present embodiment more surely, it is preferable to set the upper limit value of the conditional expression (8) to 0.28, 0.27, 0.26 and further to 0.25.

On the other hand, when the value of f/fR is equal to or falls below the lower limit value of the conditional expression (8), refractive power of the front group becomes large, and it becomes difficult to correct spherical aberration. Meanwhile, by setting the lower limit value of the conditional expression (8) to −0.05, the advantageous effect of the present embodiment can be secured more surely. Further, in order to ensure the advantageous effect of the present embodiment more surely, it is preferable to set the lower limit value of the conditional expression (8) to −0.01, 0.01, 0.05, 0.08, 0.10, 0.13, 0.15 and further to 0.16.

Further, in the optical system according to the present embodiment, it is desirable that the following conditional expression (9) is satisfied:

$$25.00 < Pex < 70.00 \tag{9}$$

where Pex denotes a distance from the position of exit pupil of the maximum image height to the image point.

The conditional expression (9) is a conditional expression which defines an appropriate position of the exit pupil. With satisfying the conditional expression (9), it is possible to make the optical system compact and to attain superb optical performance.

When the value of Pex is equal to or exceeds the upper limit value of the conditional expression (9), the most rear lens becomes large and an amount of marginal light rays becomes small. This is not preferable. Meanwhile, by setting the upper limit value of the conditional expression (9) to 65.00, the advantageous effect of the present embodiment can be secured more surely. Further, in order to ensure the advantageous effect of the present embodiment more surely, it is preferable to set the upper limit value of the conditional expression (9) to 60.00, 55.00 and further to 50.00.

On the other hand, when the value of Pex is equal to or falls below the lower limit value of the conditional expression (9), the incident angle to the sensor becomes severe, so matching with the sensor becomes worse. Meanwhile, by setting the lower limit value of the conditional expression (9) to 28.00, the advantageous effect of the present embodiment can be secured more surely. Further, in order to ensure the advantageous effect of the present embodiment more surely, it is preferable to set the lower limit value of the conditional expression (9) to 30.00, 33.00 and further to 35.00.

Further, in the optical system according to the present embodiment, it is desirable that said front group comprises, in order from the object side, the first lens group and the second lens group, said first lens group consisting of at least one positive lens and two negative lenses and satisfying the following conditional expression (10):

$$4.00 < -f1/f < 10.00 \tag{10}$$

where f1 denotes a focal length of the first lens group, and f denotes a focal length of the whole of said optical system.

In the optical system according to the present embodiment, the front group comprises the first lens group and the second lens group, said first lens group being composed of at least one positive lens and two negative lenses, thereby curvature of field and coma aberration being corrected superbly. Further, by making the second lens group to play a role of a master lens, an excellent symmetric optical system can be attained, by which coma aberration, distortion and spherical aberration can be superbly corrected.

The conditional expression (10) is a conditional expression which defines a ratio of the focal length of the first lens group relative to the whole of the focal length of the optical system. With satisfying the conditional expression (10), it is possible to attain a compact optical system having a superb optical performance.

When the value of −f1/f is equal to or exceeds the upper limit value of the conditional expression (10), refractive power of the first lens group becomes weak, which invites an increase in the Petzval sum, making difficult to correct curvature of field. Meanwhile, by setting the upper limit value of the conditional expression (10) to 9.90, the advantageous effect of the present embodiment can be secured more surely. Further, in order to ensure the advantageous effect of the present embodiment more surely, it is preferable to set the upper limit value of the conditional expression (10) to 9.80, 9.70, 9.60, 9.50, 9.40, 9.30, 9.25, 9.20, 9.15, and further to 9.10.

On the other hand, when the value of −f1/f is equal to or falls below the lower limit value of the conditional expression (10), the height of light rays incident on the second lens group becomes high and size in diameter of the second lens group becomes large. Further, correction of spherical aberration becomes difficult. Meanwhile, by setting the lower limit value of the conditional expression (10) to 4.10, the advantageous effect of the present embodiment can be secured more surely. Further, in order to ensure the advantageous effect of the present embodiment more surely, it is preferable to set the lower limit value of the conditional expression (10) to 4.20, 4.30, 4.40, 4.50, 4.60, 4.65, 4.70, 4.75, 4.80 and further to 4.85.

Further, in the optical system according to the present embodiment, it is desirable that said front group comprises, in order from the object side, the first lens group and the second lens group, said first lens group consisting of at least one positive lens and two negative lenses and satisfying the following conditional expression (11):

$$1.00 < f2/f < 2.00 \qquad (11)$$

where f2 denotes a focal length of the second lens group, and f denotes a focal length of the whole of said optical system.

In the optical system according to the present embodiment, the front group comprises the first lens group and the second lens group, said first lens group being composed of at least one positive lens and two negative lenses, thereby curvature of field and coma aberration being corrected superbly. Further, by making the second lens group to play a role of a master lens to obtain an excellent symmetric optical system, coma aberration, distortion and spherical aberration can be superbly corrected.

The conditional expression (11) is a conditional expression which defines a ratio of the focal length of the second lens group relative to the focal length of the whole of the optical system. With satisfying the conditional expression (11), it is possible to attain a compact optical system having a superb optical performance.

When the value of f2/f is equal to or exceeds the upper limit value of the conditional expression (11), load of the second lens group playing a role of a master lens becomes large, and it becomes difficult to correct spherical aberration superbly. Meanwhile, by setting the upper limit value of the conditional expression (11) to 1.90, the advantageous effect of the present embodiment can be secured more surely. Further, in order to ensure the advantageous effect of the present embodiment more surely, it is preferable to set the upper limit value of the conditional expression (11) to 1.80, 1.70, 1.65, 1.60, 1.55, 1.54 and further to 1.52.

On the other hand, when the value of f2/f is equal to or falls below the lower limit value of the conditional expression (11), the entire length of the optical system becomes large, so the size of the entire optical system becomes large. Further, load of the rear group becomes large, and correction of curvature of field becomes difficult. Meanwhile, by setting the lower limit value of the conditional expression (11) to 1.03, the advantageous effect of the present embodiment can be secured more surely. Further, in order to ensure the advantageous effect of the present embodiment more surely, it is preferable to set the lower limit value of the conditional expression (11) to 1.05, 1.08, 1.10, 1.12, 1.14 and further to 1.15.

Further, in the optical system according to the present embodiment, it is desirable that the following conditional expression (12) is satisfied:

$$30.00° < 2\omega < 50.00° \qquad (12)$$

where $2\omega$ denotes an angle of view of said optical system.

Said conditional expression (12) is a conditional expression that defines an optimum angle of view. With satisfying this conditional expression (12), it is possible to make the whole optical system compact and attain superb optical performance.

In order to ensure the advantageous effect of the present embodiment, it is preferable to set the upper limit value of the conditional expression (12) to 49.50°. Further, it is more preferable to set the upper limit value of the conditional expression (12) to 49.00°, 48.50°, 48.00°, 47.50° and 47.00°.

In order to ensure the advantageous effect of the present embodiment, it is preferable to set the lower limit value of the conditional expression (12) to 33.00°. Further, it is more preferable to set the lower limit value of the conditional expression (12) to 35.00°, 36.00°, 37.00°, 38.00° and further to 39.00°.

In the optical system according to the present embodiment, it is desirable that the following conditional expression (13) is satisfied:

$$0.20 < bfa/f < 0.40 \qquad (13)$$

where bfa denotes an air converted distance on the optical axis from the image side lens surface of the lens disposed at the most image side to the image plane, and f denote the focal length of the whole of said optical system.

The conditional expression (13) is a conditional expression that defines a ratio of the air converted distance on the optical axis from the image side lens surface of the lens disposed at the most image side to the image plane, relative to the focal length of the whole of said optical system. With satisfying the conditional expression (13), it is possible to make the whole optical system compact and attain superb optical performance.

When the value of the bfa/f is equal to or exceeds the upper limit value of the conditional expression (13), diametral dimension of the whole optical system becomes large due to large numerical aperture, and it becomes difficult to correct curvature of field. Meanwhile, by setting the upper limit value of the conditional expression (13) to 0.39, the advantageous effect of the present embodiment can be secured more surely. Further, in order to ensure the advantageous effect of the present embodiment more surely, it is preferable to set the upper limit value of the conditional expression (13) to 0.38, 0.37, 0.36, 0.35 and further to 0.34.

On the other hand, when the value of bfa/f is equal to or falls below the lower limit value of the conditional expression (13), diameter of the last lens group becomes large due to marginal light flux, so strong negative power is required in the rear side portion of the entire optical system in order to make the system small-sized, and in particular correction of spherical aberration becomes difficult. Meanwhile, by setting the lower limit value of the conditional expression (13) to 0.21, the advantageous effect ofthe present embodiment can be secured more surely. Further, in order to ensure the advantageous effect of the present embodiment more surely, it is preferable to set the lower limit value of the conditional expression (13) to 0.22, 0.23, 0.24, 0.25, and further to 0.26.

Further, in the optical system according to the present embodiment, it is desirable that the following conditional expression (14) is satisfied:

$$FNo < 1.50 \qquad (14)$$

where FNo denotes an F-number.

The conditional expression (14) is a conditional expression for defining an optimum F-number. With satisfying the conditional expression (5), it is possible to realize an optical system with a large aperture having a superb optical performance. Meanwhile, by setting the upper limit value of the conditional expression (14) to 1.40, the advantageous effect of the present embodiment can be secured more surely.

Further, in order to ensure the advantageous effect of the present embodiment more surely, it is preferable to set the upper limit value of the conditional expression (14) to 1.30, 1.20, 1.10, 1.05 and further to 1.00.

Further, in the optical system according to the present embodiment, it is desirable that said front group comprises an aperture stop. With this configuration, it is easy to attain a symmetric arrangement of the optical system at the front and back of the aperture stop, so aberration having a symmetricity such as distortion can be corrected superbly.

Further, in the optical system according to the present emodiment, it is desirable that said second lens group comprises an aperture stop. With this configuration, it is easy to attain a symmetric arrangement of the optical system at the front and back of the aperture stop, so aberration having a symmetricity such as distortion can be corrected superbly.

Further, in the optical system according to the present embodiment, it is desirable that said second lens group is composed of six or more lenses. With this configuration, it is possible to suppress refractive power of each lens and in particular to correct spherical aberration superbly.

Further, in the optical system according to the present embodiment, it is desirable that said second lens group comprises three or more negative lenses. With this configuration, it is possible to correct chromatic aberration superbly.

Further, in the optical system according to the present embodiment, it is desirable that said rear group is composed of two or more lenses. With this configuration, it is possible to correct curvature of field and other various aberrations superbly.

The optical equipment according to the present embodiment is provided with the optical system having the above described configuration, so it is possible to realize an optical equipment which has excellent optical performance in correcting excellently various aberrations and which is suitable to be used with an imaging device having highly increased number of pixels.

Further, the manufacturing method for an optical system according to the present embodiment, is a manufacturing method for an optical system comprising, in order from an object side, a front group having positive refractive power, and a rear group; comprising steps of:

configuring such that, upon conducting focusing, said front group is moved along the optical axis; and configuring such that the following conditional expression (1) being satisfied:

$$0.90 < fF/f < 1.50 \quad (1)$$

where fF denotes a focal length of said front group; and f denotes a focal length of the whole of said optical system.

With this configuration, an optical system which can suppress various aberrations superbly and which is suitable to be used with an imaging device having highly increased number of pixels, can be manufactured.

Hereinafter, the numerical examples relating to the optical systems according to the embodiment, will be explained with reference to the accompanying drawings.

First Example

FIG. 1 is a sectional view showing an optical system according to a First Example, upon carrying out focusing on an infinitely distant object.

The optical system according to the present Example is composed of, in order from an object side, a front group GF having positive refractive power, and a rear group GR having positive refractive power.

The front group GF consists of, in order from the object side, a first lens group G1 having negative refractive power and a second lens group G2 having positive refractive power.

The first lens group G1 consists of, in order from the object side, a cemented negative lens constructed by a double convex positive lens L11 cemented with a double concave negative lens L12, and a cemented negative lens constructed by a double concave negative lens L13 cemented with a double convex positive lens L14.

A double convex air lens La1 is formed by an image side lens surface of the negative lens L12 and an object side lens surface of the negative lens L13.

The second lens group G2 consists of, in order from the object side, a double convex positive lens L21, a double convex positive lens L22, a cemented negative lens constructed by a double convex positive lens L23 cemented with a double concave negative lens L24, an aperture ring S, a cemented negative lens constructed by a double concave negative lens L25 cemented with a double convex positive lens L26, a double convex positive lens L27, and a cemented negative lens constructed by a double convex positive lens L28 cemented with a double concave negative lens L29.

A double convex air lens La2 in which an aperture stop S is contained, is formed by an image side lens surface of the negative lens L24 and an object side lens surface of the negative lens L25.

The rear group GR consists of, in order from the object side, a cemented negative lens constructed by a double convex positive lens L31 cemented with a double concave negative lens L32 and a cemented positive lens constructed by a double convex positive lens L33 cemented with a double concave negative lens L34.

Between the rear group GR and the image plane I, a filter group FL consisting of a low pass filter and the like is disposed.

On the image plane I, an unillustrated imaging device constructed by CCD, CMOS and the like, is disposed.

In the optical system according to the present Example, focusing from an infinite distance object to a close distance object is carried out by moving the front group GF along the optical axis toward the object side.

Table 1 below shows various values of the optical system according to the present Example.

In Table 1, "f" denotes focal length, and "Bf" denotes a back focus, in other words, a distance on the optical axis between the most image side lens surface and the image plane I.

In [Surface Data], "m" denotes a surface number that is an order of a lens surface counted from the object side, "r" denotes a radius of curvature, "d" denotes a surface to surface distance, that is, an interval from an n-th surface to an (n+1)-th surface, where n is an integer, "nd" denotes refractive index for d-line (wavelength λ=587.6 nm), "νd" denotes an Abbe number for d-line (wavelength λ=587.6 nm), and "θgF" denotes a partial dispersion ratio between g-line and F-line. The "θgF" is shown with respect to lens satisfying the conditional expression (4). Further, "OP" denotes an object surface, "Dn" (where "n" is an integer) denotes a variable surface-to-surface distance, "S" denotes an aperture stop, and "I" denotes an image plane. Meanwhile, radius of curvature r=∞ denotes a plane surface, and refractive index of air nd=1.00000 is omitted. In addition, an aspherical surface is expressed by attaching "*" to the surface number, and in the column of the radius of curvature "r", a paraxial radius of curvature is shown.

In [Aspherical Surface Data], with respect to an aspherical surface shown in [Surface Data], an aspherical surface coefficient and a conic constant are shown in the case where the aspherical surface is exhibited by the following expression:

$$x=(h^2/r)/[1+\{1-(1+\kappa)(h/r)^2\}^{1/2}]+A4h^4+A6h^6+A8h^8+a10h^{10}+A12h^{12}+A14h^{14}$$

where "h" denotes a height in a direction perpendicular to the optical axis; "x" denotes a sag amount that is a distance in the direction of the optical axis from the tangent surface at the vertex of aspherical surface to the aspherical surface at the height "h"; "κ" denotes a conic constant; "A4", "A6", "A8", "A10", "A12", and "A14" denote respective aspherical coefficients, and "r" denotes a paraxial radius of curvature that is a radius of curvature of a reference sphere. Meanwhile, "E-n", where n is an integer, denotes "×10$^n$", for example, "1.234E-05" denotes "1.234×10$^{-6}$". Secondary aspherical surface coefficient "A2" is "0", and omitted.

In [Various Data], "f" denotes a focal length of an optical system as a whole. "Fno" denotes an F-number, "2ω" denotes an angle of view (unit "°"), "Ymax" denotes a largest image height, "TL" denotes a total length of the optical system according to the First Example, that is, a distance along the optical axis from the first surface to the image plane I, and "Bf" denotes an air converted value of a thickness of a filter group FL.

In [Variable Distance Data], "f" denotes a focal length of an optical system as a whole, "β" denotes a short distance shooting magnification, and Dn denotes a distance between n-th surface and (n+1)-th surface where "n" is an integer. Meanwhile, "Infinite" denotes a time when an infinitely distant object is focused, and "Close Distance" denotes a time when a very close distance object is focused.

In [Lens Group Data], a starting surface number ST and a focal length f of each lens group are shown.

In [Values for Conditional Expressions], values corresponding to respective conditional expressions, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Incidentally, the explanation of reference symbols in Table 1 described above, is the same in Tables for the other Examples described later.

TABLE 1

First Example
[Surface Data]

| m | r | d | nd | vd | θgF |
|---|---|---|---|---|---|
| OP | ∞ | | | | |
| *1) | 108.488 | 7.65 | 1.902650 | 35.77 | |
| 2) | −848.550 | 2.80 | 1.552981 | 55.07 | 0.54467 |
| 3) | 50.252 | 18.12 | | | |
| 4) | −60.720 | 2.80 | 1.612660 | 44.46 | 0.56396 |
| 5) | 2497.500 | 9.15 | 1.593190 | 67.90 | |
| 6) | −77.239 | 0.40 | | | |
| 7) | 113.763 | 10.95 | 1.848500 | 43.79 | |
| 8) | −178.060 | 0.40 | | | |
| 9) | 70.659 | 9.74 | 1.593190 | 67.90 | |
| 10) | −1968.500 | 0.20 | | | |
| 11) | 289.687 | 8.00 | 1.593190 | 67.90 | |
| 12) | −97.087 | 2.80 | 1.738000 | 32.33 | 0.58997 |
| 13) | 47.074 | 8.70 | | | |
| 14) (S) | ∞ | 5.29 | | | |

TABLE 1-continued

First Example
[Surface Data]

| m | r | d | nd | vd | θgF |
|---|---|---|---|---|---|
| 15) | −95.230 | 2.20 | 1.612660 | 44.46 | 0.56396 |
| 16) | 41.204 | 11.55 | 1.497820 | 82.57 | |
| 17) | −273.092 | 0.20 | | | |
| 18) | 76.173 | 9.50 | 1.883000 | 40.69 | |
| 19) | −101.575 | 0.20 | | | |
| *20) | 176.128 | 7.45 | 1.953750 | 32.33 | |
| 21) | −67.221 | 1.80 | 1.738000 | 32.33 | 0.58997 |
| 22) | 55.510 | D22 | | | |
| 23) | 71.413 | 6.35 | 1.883000 | 40.69 | |
| 24) | −115.025 | 1.81 | 1.698950 | 30.13 | |
| 25) | 46.943 | 0.80 | | | |
| 26) | 55.281 | 9.11 | 1.883000 | 40.69 | |
| 27) | −144.041 | 3.00 | 1.768538 | 46.76 | |
| *28) | 52.858 | 14.50 | | | |
| 29) | ∞ | 1.60 | 1.516800 | 64.14 | |
| 30) | ∞ | 1.00 | | | |
| I | ∞ | | | | |

[Aspherical Surface Data]
m:1
κ=0.0000
A4=−3.82177E-07, A6=−6.06486E-11, A8=−3.80172E-15, A10=−1.32266E-18
m:20
κ=0.0000
A4=−1.15028E-06, A6=−4.51771E-10, A8=2.72670E-13, A10=−7.66812E-17
m:28
κ=0.0000
A4=3.18645E-06, A6=−1.14718E-08, A8=−7.74567E-11, A10=−2.24225E-13, A12=3.34790E-16, A14=−1.70470E-19

[Various Data]
f 59.62
Fno 0.98
2ω 39.96
Ymax 21.70
TL 160.74
BF 17.10
BF (Air converted length) 16.55

[Variable Distance Data]

| | Infinite | Close Distance |
|---|---|---|
| f | 59.62 | |
| β | | −0.194 |
| D22 | 2.68 | 21.29 |

[Lens Group Data]

| Group | ST | f |
|---|---|---|
| GF | 1 | 75.60 |
| GR | 23 | 294.37 |
| G1 | 1 | −289.87 |

[Values for Conditional Expressions]
(1) fF/f=1.27
(2) (r2L1+r1L1)/(r2L1−r1L1)=0.09
(3) (r2L2+r1L2)/(r2L2−r1L2)=0.34
(4) θgFLn+0.0021×vdLn=0.657
(4) θgFLn+0.0021×vdLN=0.658
(4) θgFLn+0.0021×vdLN=0.660
(5) rc/bfa=3.19

(6) rA/TLA=1.79
(7) rB/TLB=2.52
(8) f/fR=0.20
(9) Pex=43.85
(10) −f1/f=4.86
(11) f2/f=1.16
(12) 2ω=39.96°
(13) bfa/f=0.28
(14) FNo=0.98

FIG. 2A and FIG. 2B are graphs showing various aberrations of the First Example upon focusing on an infinitely distant object and on a close distance object, respectively.

In respective graphs, FNO denotes an F-number, Y denotes an image height, and NA denotes a numerical aperture. Meanwhile, in the graph of spherical aberration, a value of F-number FNO or a numerical aperture NA corresponding to the maximum aperture diameter is shown, and in the graph of astigmatism and the graph of distortion, the maximum values of the image height Y are respectively shown. In the graph of coma aberration, values of respective image heights are shown. In respective graphs, C denotes an aberration curve at C-line (wavelength 656.3 nm), d denotes an aberration curve at d-line (wavelength 587.6 nm), F denotes an aberration curve at F-line (wavelength 486.1 nm) and g denotes an aberration curve at g-line (wavelength 435.8 nm), and an aberration curve to which no indication is made is for d-line. In the graph showing astigmatism, a solid line indicates a sagittal image plane, and a broken line indicates a meridional image plane. In the graph of coma aberration, aberration curves at respective image heights Y are shown.

Incidentally, the above-described explanation regarding various aberration graphs is the same with respect to the other Examples.

It is apparent from the respective graphs that the optical system according to the present Example can correct superbly various aberrations and has excellent optical performance, from the time when an infinite distance object is focused to time when a close distance object is focused.

Second Example

Figure 3:
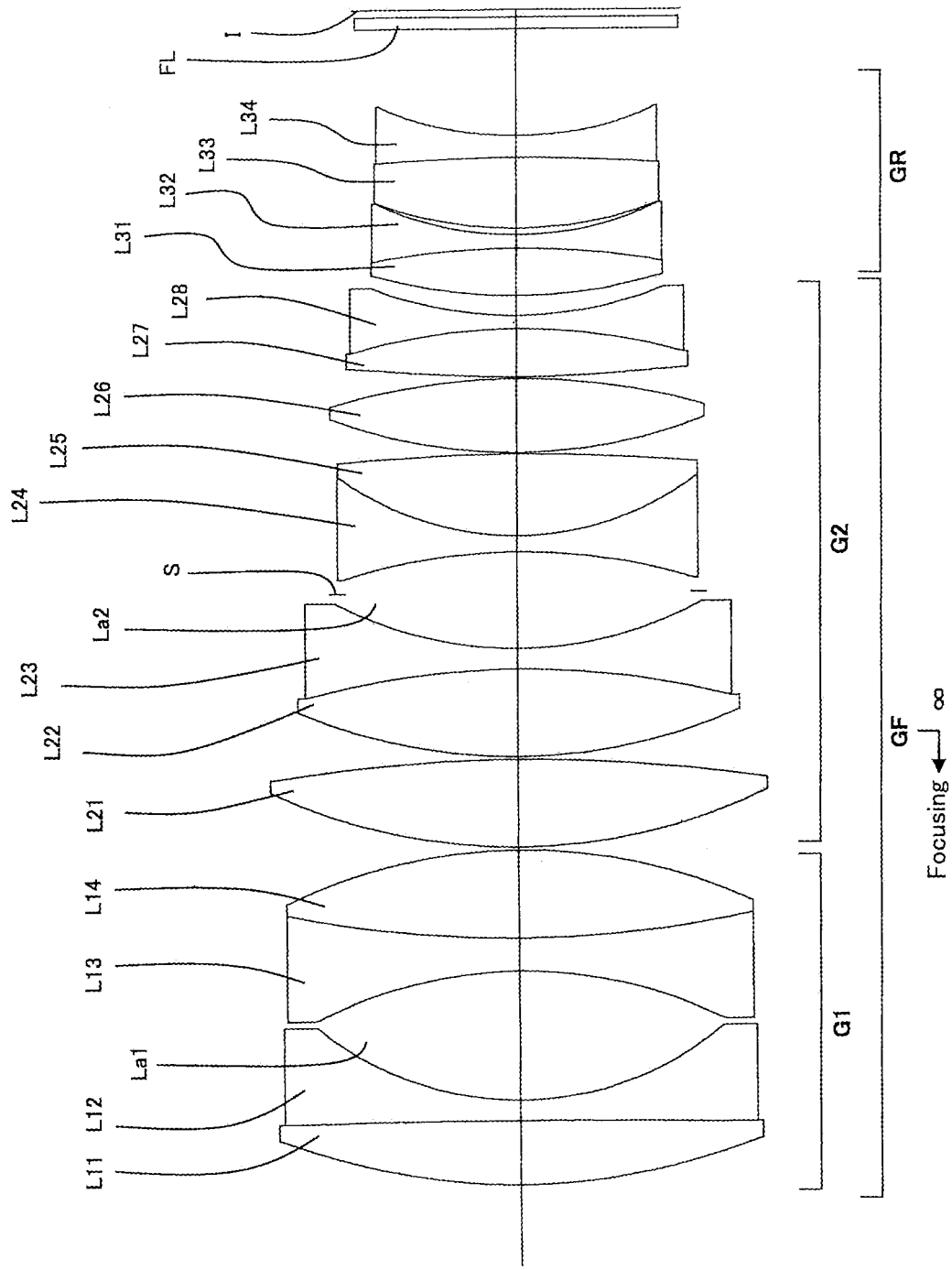
FIG. 3 is a sectional view showing an optical system according to a Second Example.

FIG. 3 is a sectional view showing an optical system according to a Second Example, upon focusing on an infinitely distant object.

The optical system according to the present Example is composed of, in order from an object side, a front group GF having positive refractive power, and a rear group GR having positive refractive power.

The front group GF consists of, in order from the object side, a first lens group G1 having negative refractive power and a second lens group G2 having positive refractive power.

The first lens group G1 consists of, in order from the object side, a cemented negative lens constructed by a double convex positive lens L11 cemented with a double concave negative lens L12, and a cemented negative lens constructed by a double concave negative lens L13 cemented with a double convex positive lens L14.

A double convex air lens La1 is formed by an image side lens surface of the negative lens L12 and an object side lens surface of the negative lens L13.

The second lens group G2 consists of, in order from the object side, a double convex positive lens L21, a cemented negative lens constructed by a double convex positive lens L22 cemented with a double concave negative lens L23, an aperture stop S, a cemented negative lens constructed by a double concave negative lens L24 cemented with a double convex positive lens L25, a double convex positive lens L26, and a cemented negative lens constructed by a double convex positive lens L27 cemented with a double concave negative lens L28.

A double convex air lens La2 in which an aperture stop S is contained, is formed by an image side lens surface of the negative lens L23 and an object side lens surface of the negative lens 24.

The rear group GR consists of, in order from the object side, a cemented negative lens constructed by a double convex positive lens L31 cemented with a double concave negative lens L32 and a cemented positive lens constructed by a double convex positive lens L33 cemented with a double concave negative lens L34.

Between the rear group GR and the image plane I, a filter group FL consisting of a low pass filter and the like is disposed.

On the image plane, an unillustrated imaging device constructed by CCD, CMOS and the like, is disposed.

In the optical system according to the present Example, focusing from an infinite distance object to a close distance object is carried out by moving the front group GF along the optical axis toward the object side.

Table 2 below shows various values of the optical system according to the present Example.

TABLE 2

Second Example
[Surface Data]

| m | r | d | nd | vd | θgF |
|---|---|---|---|---|---|
| OP | ∞ | | | | |
| *1) | 84.843 | 8.88 | 1.902650 | 35.77 | |
| 2) | −1742.595 | 2.80 | 1.552981 | 55.07 | 0.54467 |
| 3) | 44.232 | 17.70 | | | |
| 4) | −63.458 | 4.49 | 1.612660 | 44.46 | 0.56396 |
| 5) | 160.451 | 12.00 | 1.593190 | 67.90 | |
| 6) | −77.097 | 0.40 | | | |
| 7) | 80.675 | 12.00 | 1.848500 | 43.79 | |
| 8) | −225.566 | 0.40 | | | |
| 9) | 77.209 | 12.00 | 1.593190 | 67.90 | |
| 10) | −117.176 | 2.80 | 1.737999 | 32.33 | 0.58997 |
| 11) | 53.947 | 7.63 | | | |
| 12) (S) | ∞ | 5.60 | | | |
| 13) | −84.000 | 2.20 | 1.720467 | 34.71 | 0.58340 |
| 14) | 41.872 | 11.15 | 1.497820 | 82.57 | |
| 15) | −285.714 | 0.20 | | | |
| 16) | 73.142 | 10.14 | 1.883000 | 40.69 | |
| 17) | −93.038 | 0.20 | | | |
| *18) | 165.947 | 6.59 | 1.953750 | 32.33 | |
| 19) | −83.716 | 1.80 | 1.672999 | 38.26 | 0.57570 |
| 20) | 55.556 | D20 | | | |
| 21) | 71.429 | 6.52 | 1.883000 | 40.69 | |
| 22) | −112.325 | 1.80 | 1.698950 | 30.13 | |
| 23) | 46.100 | 0.89 | | | |
| 24) | 55.249 | 9.74 | 1.883000 | 40.69 | |
| 25) | −250.769 | 2.97 | 1.765538 | 46.75 | |
| *26) | 53.058 | 14.52 | | | |
| 27) | ∞ | 1.60 | 1.516800 | 64.14 | |
| 28) | ∞ | 1.00 | | | |
| I | | | | | |

[Aspherical Surface Data]
m:1
κ=0.0000
A4=−3.12694E−07, A6=−5.48964E−11, A8=−1.79711E−14, A10=−1.73223E−18
m:18
κ=0.0000
A4=−1.26938E−06, A6=−4.97145E−10, A8=2.93406E−13, A10=−1.78209E−16 m:26
κ=0.0000
a4=2.60259E-06, A6=−6.63089E-09, A8=6.98584E-11, A10=−2.75672E-13, A12=5.74140E-16, A14=−4.50780E-19
[Various Data]
f 58.93
FNo 0.98
2ω 40.39
Ymax 21.70
TL 160.71
BF 17.12
BF (Air converted length) 16.57

| [Variable Distance Data] | | |
|---|---|---|
| | Infinite | Close Distance |
| F | 58.93 | |
| β | | −0.188 |
| D20 | 2.70 | 20.39 |

| [Lens Group Data] | | |
|---|---|---|
| Group | ST | f |
| GF | 1 | 74.42 |
| GR | 21 | 335.84 |
| G1 | 1 | −504.22 |
| G2 | 7 | 71.19 |

[Values for Conditional Expressions]
(1) fF/f=1.26
(2) (r2L1+r1L1)/(r2L1−r1L1)=0.18
(3) (r2L2+r1L2)/(r2L2−r1L2)=0.22
(4) θgFLn+0.0021×vdLn=0.656
(4) θgFLn+0.0021×vdLn=0.657
(4) θgFLn+0.0021×vdLn=0.658
(4) θgFLn+0.0021×vdLn=0.660
(5) rc/bfa=3.20
(6) rA/TLA=1.76
(7) rB/TLB=2.48
(8) f/fR=0.18
(9) Pex=44.85
(10) −f1/f=8.56
(11) f2/f=1.21
(12) 2ω=40.39°
(13) bfa/f=0.28
(14) FNo=0.98

FIG. 4A and FIG. 4B are graphs showing various aberrations of the Second Example upon focusing on an infinitely distant object and on a close distance object, respectively.

It is apparent from the respective graphs that the optical system according to the present Example can correct superbly various aberrations and has excellent optical performance, from the time when an infinite distance object is focused to the time when a close distance object is focused.

Third Example

Figure 5:
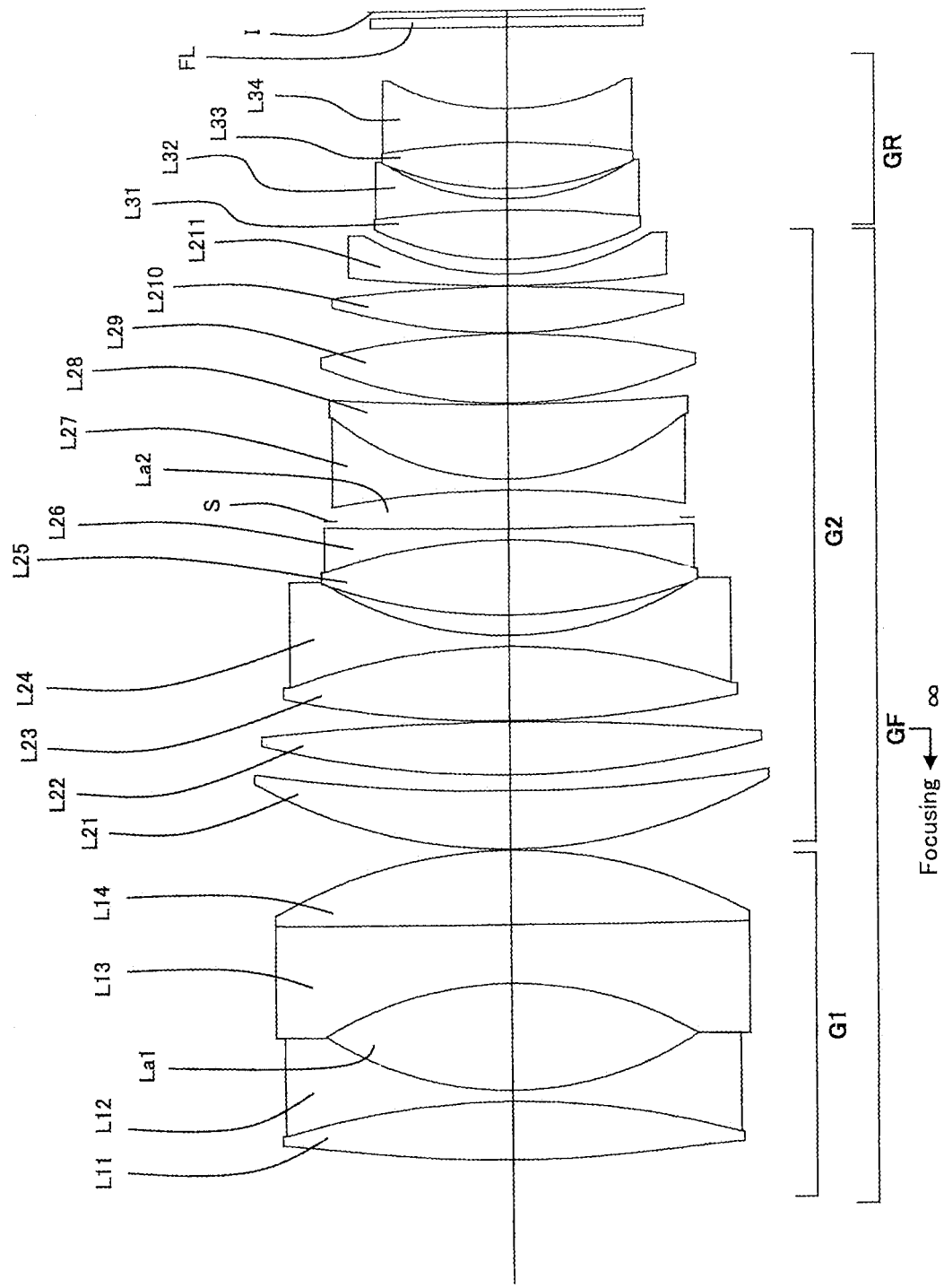
FIG. 5 is a sectional view showing an optical system according to a Third Example.

FIG. 5 is a sectional view showing an optical system according to a Third Example, upon focusing on an infinitely distant object.

The optical system according to the present Example is composed of, in order from an object side, a front group GF having positive refractive power, and a rear group GR having positive refractive power.

The front group GF is composed of, in order from the object side, a first lens group G1 having negative refractive power and a second lens group G2 having positive refractive power.

The first lens group G1 consists of, in order from the object side, a cemented negative lens constructed by a double convex positive lens L11 cemented with a double concave negative lens L12, and a cemented positive lens constructed by a double concave negative lens L13 cemented with a double convex positive lens L14.

A double convex air lens La1 is formed by an image side lens surface of the negative lens L12 and an object side lens surface of the negative lens L13.

The second lens group G2 consists of, in order from the object side, a positive meniscus lens L21 having a convex surface toward the object side, a double convex positive lens L21, a cemented negative lens constructed by a double convex positive lens L23 cemented with a double concave negative lens L24, a cemented positive lens constructed by a double convex positive lens L25 cemented with a double concave negative lens L26, an aperture stop S, a cemented negative lens constructed by a double concave negative lens L27 cemented with a positive meniscus lens L28 having a convex surface toward the object side, a double convex positive lens L29, a double convex positive lens L210, and a negative meniscus lens L211 having a convex surface toward the object side.

A double convex air lens La2 in which the aperture stop S is contained, is formed by an image side lens surface of the negative lens L26 and an object side lens surface of the negative lens L27.

The rear group GR consists of, in order from the object side, a cemented positive lens constructed by a double convex positive lens L31 cemented with a double concave negative lens L32 and a cemented positive lens constructed by a double convex positive lens L33 cemented with a double concave negative lens L34.

Between the rear group GR and the image plane I, a filter group FL consisting of a low pass filter and the like is disposed.

On the image plane I, an unillustrated imaging device constructed by CCD, CMOS and the like, is disposed.

In the optical system according to the present Example, focusing from an infinite distance object to a close distance object is carried out by moving the front group GF along the optical axis toward the object side.

Table 3 below shows various values of the optical system according to the present Example.

TABLE 3

Third Example
[Surface Data]

| m | r | d | nd | vd | θgF |
|---|---|---|---|---|---|
| OP | ∞ | | | | |
| *1) | 185.899 | 9.54 | 1.953750 | 32.33 | |
| 2) | −137.785 | 1.80 | 1.612660 | 44.46 | 0.56396 |
| 3) | 57.357 | 17.16 | | | |
| 4) | −61.400 | 9.43 | 1.755200 | 27.57 | |
| 5) | 3320.945 | 12.00 | 1.883000 | 40.69 | |
| 6) | −79.440 | 0.20 | | | |
| 7) | 86.368 | 9.31 | 1.922860 | 20.88 | |
| 8) | 282.614 | 2.62 | | | |
| 9) | 164.628 | 8.52 | 1.883000 | 40.69 | |
| 10) | −433.246 | 0.20 | | | |
| 11) | 178.385 | 12.00 | 1.593190 | 67.90 | |
| 12) | −109.726 | 1.80 | 1.755200 | 27.57 | |
| 13) | 58.133 | 3.31 | | | |

TABLE 3-continued

Third Example
[Surface Data]

| m | r | d | nd | vd | θgF |
|---|---|---|---|---|---|
| 14) | 91.870 | 12.00 | 1.497820 | 82.57 | |
| 15) | -98.193 | 1.80 | 1.755200 | 27.57 | |
| 16) | 906.006 | 1.50 | | | |
| 17) (S) | ∞ | 4.71 | | | |
| 18) | -172.200 | 1.80 | 1.755200 | 27.57 | |
| 19) | 46.351 | 12.00 | 1.497820 | 82.57 | |
| 20) | 405.680 | 0.20 | 1.000000 | | |
| 21) | 82.227 | 11.14 | 1.755000 | 52.34 | |
| 22) | -138.448 | 0.20 | | | |
| *23) | 87.956 | 7.41 | 1.922860 | 20.88 | |
| 24) | -256.167 | 0.20 | | | |
| 25) | 225.911 | 1.80 | 1.672999 | 38.26 | 0.57570 |
| 26) | 46.387 | D23 | | | |
| 27) | 49.877 | 7.98 | 1.883000 | 40.69 | 0.56730 |
| 28) | -185.543 | 1.80 | 1.698950 | 30.13 | 0.60210 |
| 29) | 37.894 | 1.69 | | | |
| 30) | 52.649 | 7.35 | 1.883000 | 40.69 | 0.56730 |
| 31) | -136.958 | 5.47 | 1.806100 | 40.97 | 0.56880 |
| *32) | 47.095 | 13.12 | | | |
| 33) | ∞ | 1.60 | 1.516800 | 64.14 | 0.53574 |
| 34) | ∞ | 1.00 | | | |
| I | | | | | |

[Aspherical Surface Data]

m:1
κ=0.0000
A4=-4.46166E-07, A6=-5.12059E-11, A8=-5.73749E-16, A10=-7.59667E-19 m:23
κ=0.0000
A4=-6.70053E-07, A6=-1.40564E-10, A8=-2.88155E-14, A10=5.19675E-17 m:32
κ=0.0000
A4=2.53486E-06, A6=-6.25069E-09, A8=5.60707E-11, A10=-1.82993E-13, A12=3.28690E-16, A14=-2.06450E-19

[Various Data]
f 56.61
FNo 0.87
2ω 42.76
Ymax 21.70
TL 185.01
BF 15.72
BF (Air converted length) 15.17

[Variable Distance Data]

| | Infinite | Close Distance |
|---|---|---|
| f | 56.61 | |
| β | | -0.199 |
| D20 | 2.36 | 24.15 |

[Lens Group Data]

| Group | ST | f |
|---|---|---|
| GF | 1 | 78.66 |
| GR | 27 | 242.22 |
| G1 | 1 | -512.59 |
| G2 | 7 | 85.35 |

[Values for Conditional Expressions]
(1) fF/f=1.39
(2) (r2L1+r1L1)/(r2L1-r1L1)=0.03
(3) (r2L2+r1L2)/(r2L2-r1L2)=-0.68
(4) θgFLn+0.0021×vdLn=0.656
(4) θgFLn+0.0021×vdLn=0.657
(5) rc/bfa=3.10
(6) ra/TLA=1.47
(7) rB/TLB=1.71
(8) f/fR=0.23
(9) Pex=40.21
(10) -f1/f=9.05
(11) f2/f=1.51
(12) 2ω=42.76°
(13) bfa/f=0.27
(14) FNo=0.87

FIG. 6A and FIG. 6B are graphs showing various aberrations of the Third Example upon focusing on an infinitely distant object and on a close distance object, respectively.

It is apparent from the respective graphs that the optical system according to the present Example can correct superbly various aberrations and has excellent optical performance, from the time when an infinite distance object is focused to the time when a close distance object is focused.

Fourth Example

Figure 7:
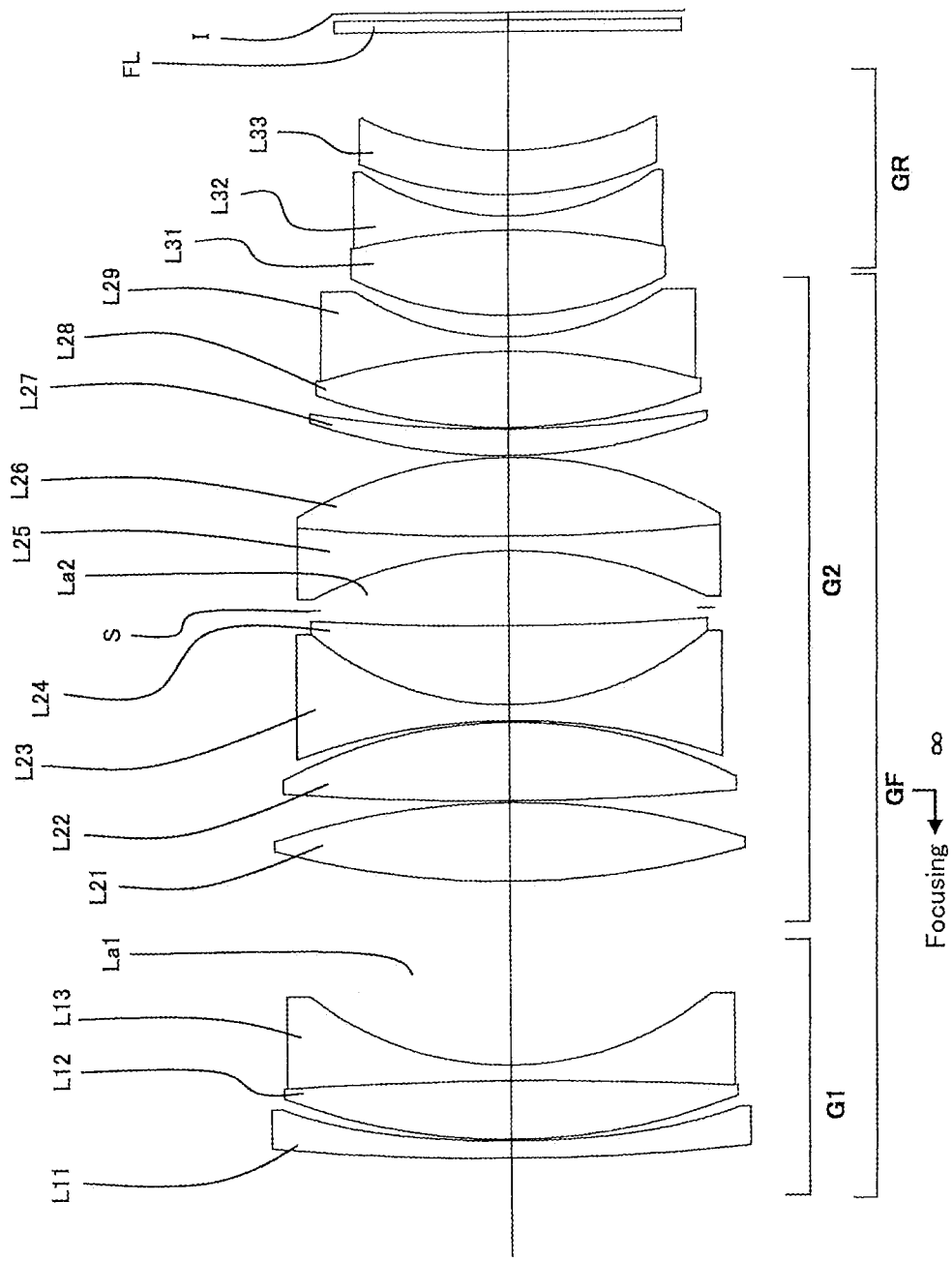
FIG. 7 is a sectional view showing an optical system according to a Fourth Example.

FIG. 7 is a sectional view showing an optical system according to a Fourth Example, upon focusing on an infinitely distant object.

The optical system according to the present Example is composed of, in order from an object side, a front group GF having positive refractive power, and a rear group GR having positive refractive power.

The front group GF is composed of, in order from the object side, a first lens group G1 having negative refractive power and a second lens group G2 having positive refractive power.

The first lens group G1 consists of, in order from the object side, a negative meniscus lens L11 having a convex surface facing the object side, and a cemented positive lens constructed by a double convex positive lens L12 cemented with a double concave negative lens L13.

The second lens group G2 consists of, in order from the object side, a double convex positive lens L21, a double convex positive lens L22, a cemented negative lens constructed by a double concave negative lens L23 cemented with a positive meniscus lens L24 having a convex surface facing the object side, an aperture stop S, a cemented positive lens constructed by a double concave negative lens L25 cemented with a double convex positive lens L26, a positive meniscus lens L27 having a convex surface facing the object side, and a cemented negative lens constructed by a double convex positive lens L28 cemented with a double concave negative lens L29.

An air lens La1 having a convex face toward the object side is formed by an image side lens surface of the negative lens L13 of the first lens group G1 and an object side lens surface of the positive lens L21 of the second lens group G2.

A double convex air lens La2 in which the aperture stop S is contained, is formed by an image side lens surface of the positive meniscus lens L24 and an object side lens surface of the negative lens L25 in the second lens group G2.

The rear group GR consists of, in order from the object side, a cemented positive lens constructed by a double convex positive lens L31 cemented with a double concave negative lens L32 and a positive meniscus lens L33 having a convex surface toward the object side.

Between the rear group GR and the image plane I, a filter group FL consisting of a low pass filter and the like is disposed.

On the image plane I, an unillustrated imaging device constructed by CCD, CMOS and the like, is disposed.

In the optical system according to the present Example, focusing from an infinite distance object to a close distance object is carried out by moving the front group GF along the optical axis toward the object side.

Table 4 below shows various values of the optical system according to the present Example.

TABLE 4

Fourth Example
[Surface Data]

| m | r | d | nd | vd | θgF |
|---|---|---|----|----|-----|
| OP | ∞ | | | | |
| 1) | 321.297 | 2.20 | 1.743531 | 49.46 | 0.55310 |
| *2) | 141.100 | 0.20 | | | |
| 3) | 81.476 | 7.45 | 2.000690 | 25.46 | |
| 4) | −533.967 | 2.00 | 1.575010 | 41.51 | |
| 5) | 41.890 | 23.21 | | | |
| 6) | 114.722 | 10.00 | 1.755000 | 52.34 | |
| 7) | −102.377 | 0.20 | | | |
| 8) | 363.127 | 10.00 | 1.433848 | 95.23 | |
| 9) | −63.288 | 0.20 | | | |
| 10) | −81.853 | 2.00 | 1.728250 | 28.38 | |
| 11) | 40.229 | 10.00 | 1.497820 | 82.57 | |
| 12) | 387.084 | 2.07 | | | |
| 13) (S) | ∞ | 7.39 | | | |
| 14) | −57.411 | 1.80 | 1.698950 | 30.13 | |
| 15) | 288.324 | 10.00 | 1.816000 | 46.59 | |
| 16) | −54.150 | 0.20 | | | |
| *17) | 72.170 | 3.37 | 1.883000 | 40.66 | |
| 18) | 153.608 | 0.20 | | | |
| 19) | 74.349 | 9.64 | 2.000690 | 25.46 | |
| 20) | −82.672 | 1.80 | 1.688930 | 31.16 | |
| 21) | 36.393 | D21 | | | |
| 22) | 45.019 | 10.76 | 1.816000 | 46.59 | |
| 23) | −93.154 | 1.80 | 1.647690 | 33.73 | |
| 24) | 34.053 | 2.68 | | | |
| 25) | 47.420 | 5.62 | 1.851350 | 40.10 | |
| *26) | 48.720 | 15.00 | | | |
| 27) | ∞ | 1.50 | 1.516800 | 64.14 | |
| 28) | ∞ | 1.00 | | | |
| I | | | | | |

[Aspherical Surface Data]
m:2
κ=0.0000
A4=1.16114E-06, A6=2.95643E-10, A8=−6.37189E-14, A10=1.41668E-16
m:17
κ=0.0000
A4=−6.16353E-07, A6=−4.48845E-11, A8=−3.85019E-13, A10=2.55435E-16
m:26
κ=0.0000
A4=3.59886E-06, A6=−1.74814E-08, A8=1.46565E-10, A10=−5.81529E-13, A12=1.21940E-15, A14=−1.02110E-18
[Various Data]
f 51.60
FNo 0.98
2ω 46.48
Ymax 21.70
TL 145.01
BF 17.50
BF (Air converted length) 16.95

[Variable Distance Data]

| | Infinite | Close Distance |
|---|---|---|
| f | 51.60 | |
| β | | −0.159 |
| D20 | 2.72 | 18.14 |

[Lens Group Data]

| Group | ST | f |
|---|---|---|
| GF | 1 | 70.85 |
| GR | 22 | 218.68 |
| G1 | 1 | −337.62 |
| G2 | 6 | 63.59 |

[Values for Conditional Expressions]
(1) fF/f=1.37
(2) (r2L1+r1L1)/(r2L1−r1L1)=2.15
(3) (r2L2+r1L2)/(r2L2−r1L2)=−0.74
(4) θgFLn+0.0021×vdLn=0.657
(5) rc/bfa=2.87
(6) rA/TLA=1.12
(7) rb/TLB=1.51
(8) f/fR=0.24
(9) Pex=40.00
(10) −f1/f=6.54
(11) f2/f=1.23
(12) 2ω=46.48°
(13) bfa/f=0.33
(14) FNo=0.98

FIG. 8A and FIG. 8B are graphs showing various aberrations of the Fourth Example upon focusing on an infinitely distant object and on a close distance object, respectively.

It is apparent from the respective graphs that the optical system according to the present Example can correct superbly various aberrations and has excellent optical performance, from the time when an infinite distance object is focused to the time when a close distance object is focused.

According to each of the above Examples, it is possible to realize an optical system which has superb optical performance being able to correct superbly various aberrations and which can be used suitably for an imaging device having highly increased number of pixels.

Incidentally, it is noted that each of the above described Examples is a concrete example of the invention of the present application, and the invention of the present application is not limited to them. The contents described below can be adopted without deteriorating optical performance of the optical systems according to the present embodiments.

Although optical systems each having a 2 group configuration were illustrated above as numerical examples of the optical systems according to the present embodiment, the present embodiment is not limited to them and optical systems having other configurations (for example, a 3 group configuration and the like) can be configured. Concretely, a lens configuration that a lens or a lens group is added to the most object side or to the most image side of the optical system of each Example described above is possible. Alternatively, a lens or a lens group may be added between the neighboring lens groups.

Further, although the front groups each having a 2 group configuration were illustrated, the present application is not limited to them and other configuration such as 3 group configuration is possible. Concretely, a lens configuration that a lens or a lens group is added to the most object side or to the most image side or between the first lens group and the second lens group of the front group of each Example described above is possible. Further, a lens or a lens group may be added to the object side of the image side of the rear group of each Example described above.

Further, in each Example described above, the front group is made as focusing lens group. Such focusing lens group may be used for auto focus and suitably driven by a motor for auto focus, such as, ultra sonic motor, stepping motor, or VCM motor.

Further, in the optical system according to each Example described above, any lens group as a whole or a portion thereof can be so moved, as a vibration reduction lens group, to have a component in a direction perpendicular to the optical axis, or rotationally moved (swayed) in an intra-plane direction including the optical axis, to carry out vibration reduction Further, in the optical system according to each Example described above, an aperture stop may be substituted by a lens frame without disposing a member as an aperture stop.

Further, the lens surface(s) of the lenses configuring the optical system according to each Example described above, may be a spherical surface, a plane surface, or an aspherical surface.

When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable.

When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be graded-index type lens (GRIN lens) or a plastic lens.

Moreover, the lens surface(s) of the lenses configuring the optical system according to each Example described above, may be coated with anti-reflection coating(S) having high transparency in a broad wavelength range. With this contrivance, it is feasible to reduce a flare as well as ghost and attain a high optical performance with high contrast.

Next, a camera equipped with the optical system according to the present embodiment, will be explained with referring to FIG. 9.

Figure 9:
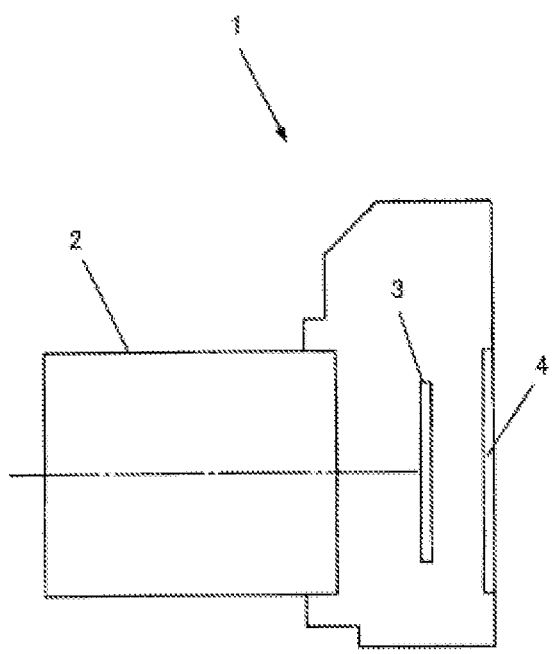
FIG. 9 is a view showing a configuration of a camera equipped with the optical system.

FIG. 9 shows a configuration of a camera equipped with the optical system according to the present embodiment of the present application.

The camera 1, as shown in FIG. 9, is a lens changeable type mirror-less camera equipped with the optical system according to the First Example as an imaging lens 2.

In the present camera 1, light emitted from an unillustrated object (object to be photo taken) is converged by the imaging lens 2, through an unillustrated OLPF (optical low pass filter), and forms an object image on an imaging plane of an imaging portion 3. The object image is photoelectrically converted by a photoelectric conversion element provided on the imaging portion 3, thereby a picture image of the object to be photo taken being formed. This picture image is displayed on an EVF (electronic view finder) 4 provided in the camera 1. Accordingly, a photographer can observe the object image through the EVF 4.

When the photographer presses an unillustrated release button down, the picture image of the object generated in the imaging portion 3, is stored in an unillustrated memory as a photographed image of the object. In this manner, the photographer can take a picture of an object by the camera 1.

The present camera 1 in which the optical system according to the First Example, is mounted, has superb optical performance correcting superbly various aberrations and which can be used suitably for an imaging device having highly increased number of pixels. In other words, the present camera 1 is suitable for an imaging device having highly increased number of pixels and can attain high optical performance.

Incidentally, even if an optical system according to each of the Second to the Fourth Examples is installed as an imaging lens 2 in a camera, the same effect as the said camera 1 can be obtained. Further, even if an optical system according to each of the above Examples is mounted in a camera which includes a quick return mirror and in which an object to be photographed is observed through a view finder optical system, the same effect as the above described camera 1 can be obtained.

Figure 10:
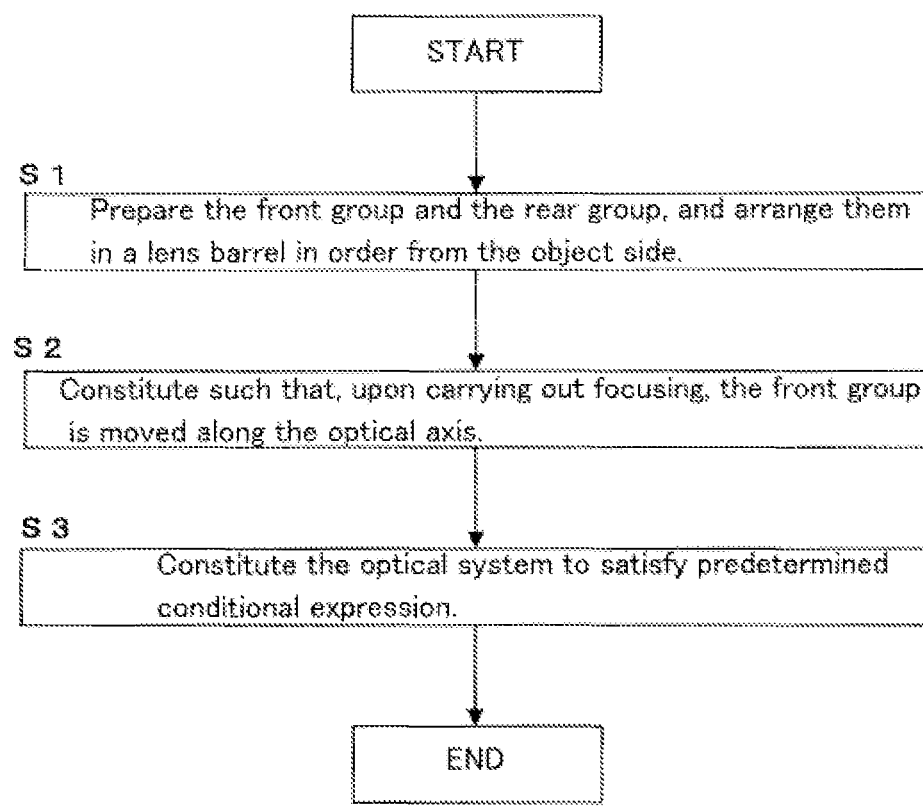
FIG. 10 is a view showing a flow chart of a manufacturing method for the optical system.

Next, an outline of a method for manufacturing an optical system according to the present embodiment of the present application, is described with referring to FIG. 10.

FIG. 10 is a flowchart showing an outline of a method for manufacturing an optical system according to the present emodiment.

The method for manufacturing the optical system according to the present embodiment shown in FIG. 10, is a method for manufacturing an optical system comprising, in order from an object side: a front group having positive refractive power, and a rear group; the method comprising the following steps S1 to S3:

Step S1: preparing the front group and the rear group, and disposing them, in order from the object side, in a lens barrel.

Step S2: configuring such that the front group is moved along the optical axis, upon carrying out focusing.

Step S3: configuring such that the optical system satisfies the following conditional expression (1):

$$0.90 < fF/f < 1.50 \qquad (1)$$

where fF denotes a focal length of said front group and f denotes a focal length of the whole of the optical system.

According to such method for manufacturing an optical system according to the present embodiment, it is possible to manufacture an optical system which has superb optical performance being able to correct superbly various aberrations and which can be used suitably for an imaging device having highly increased number of pixels.

EXPLANATION OF REFERENCES

GF front group
GR rear group
G1 first lens group
G2 second lens group
S aperture stop
I image plane
1 camera
2 imaging lens

What is claimed is:

1. An optical system comprising, in order from an object side, a front group having positive refractive power, and a rear group;

the front group being moved along the optical axis, upon carrying out focusing; and
the following conditional expression being satisfied:

$$0.90<fF/f<1.50$$

where fF denotes a focal length of the front group and f denotes a focal length of the whole of the optical system;
the front group comprising at least two convex-shaped air lenses, and one of the air lenses, which has a longest length on the optical axis, satisfying the following conditional expression:

$$-1.00<(r2L1+r1L1)/(r2L1-r1L1)-3.00$$

where r1L1 denotes a curvature radius of an object side lens surface of the air lens which has the longest length on the optical axis, and r2L1 denotes a curvature radius of an image side lens surface of the air lens which has the longest length on the optical axis.

2. An optical system according to claim 1, wherein one of the air lenses, which has a second longest length on the optical axis, satisfies the following conditional expression:

$$-2.00<(r2L2+r1L2)/(r2L2-r1L2)<2.00$$

where r1L2 denotes a curvature radius of an object side lens surface of the air lens which has the second longest length on the optical axis, and r2L2 denotes a curvature radius of an image side lens surface of the air lens which has the second longest length on the optical axis.

3. An optical system according to claim 1, wherein the front group comprises at least one negative lens that satisfies the following conditional expression:

$$\theta gFLn+0.0021\times vdLn<6.70$$

where vdLn denotes Abbe number of the negative lens for d-line, and θgFLn denotes a partial dispersion ratio of the negative lens between g-line and F-line.

4. An optical system according to claim 1, wherein an image side lens surface of a lens disposed at the most image side is a convex surface toward the object side.

5. An optical system according to claim 1, wherein the following conditional expression is satisfied:

$$1.50<rc/bfa<4.50$$

where rc denotes a curvature radius of the image side lens surface of the lens disposed at the most image side, and bfa denotes an air converted distance on the optical axis from the image side lens surface of the lens disposed at the most image side to the image plane.

6. An optical system according to claim 1, wherein the following conditional expression is satisfied:

$$0.80<rA/TLA<2.50$$

where rA denotes a curvature radius of an image side lens surface of the lens disposed at the most image side in the front group, and TLA denotes an air converted distance on the optical axis from the image side lens surface of the lens disposed at the most image side in the front group to the image plane, in the focusing state onto an infinitely distant object.

7. An optical system according to claim 1, wherein the following conditional expression is satisfied:

$$1.20<rB/TLB<3.00$$

where rB denotes a curvature radius of an object side lens surface of the lens disposed at the most object side in the rear group, and TLB denotes an air converted distance on the optical axis from the object side lens surface of the lens disposed at the most object side in the rear group to the image plane, in the focusing state onto an infinitely distant object.

8. An optical system according to claim 1, wherein the following conditional expression is satisfied:

$$-0.10<f/fR<0.30$$

where fR denotes a focal length of the rear group.

9. An optical system according to claim 1, wherein the front group comprises, in order from the object side, a first lens group and a second lens group,
the first lens group consisting of two negative lenses and at least one positive lens, and
the following conditional expression is satisfied:

$$4.00<-f1/f<10.00$$

where f1 denotes a focal length of the first lens group.

10. An optical system according to claim 1, wherein the front group comprises, in order from the object side, a first lens group and a second lens group;
the first lens group consists of two negative lenses and at least one positive lens; and
the following conditional expression is satisfied:

$$1.00<f2/f<2.00$$

where f2 denotes a focal length of the second lens group.

11. An optical system according to claim 1, wherein the following conditional expression is satisfied:

$$30.00°<2\omega<50.00°$$

where 2ω denotes an angle of view of the optical system.

12. An optical system according to claim 1, wherein the following conditional expression is satisfied:
$$0.20<bfa/f<0.40$$
where bfa denotes an air converted distance on the optical axis from the image side lens surface of the lens disposed at the most image side to the image plane.

13. An optical system according to claim 1, wherein the front group comprises an aperture stop.

14. An optical system according to claim 9, wherein the second lens group comprises an aperture stop.

15. An optical system according to claim 9, wherein the second lens group is composed of six or more lenses.

16. An optical system according to claim 9, wherein the second lens group comprises three or more negative lenses.

17. An optical system according to claim 1, wherein the rear group is composed of two or more lenses.

18. An optical equipment equipped with the optical system according to claim 1.

19. A manufacturing method for an optical system configured to comprise, in order from an object side, a front group having positive refractive power, and a rear group, the method comprising:
configuring such that, upon carrying out focusing, the front group is moved along the optical axis; and
configuring such that the following conditional expression is satisfied:

$$0.90<fF/f<1.50$$

where fF denotes a focal length of the front group and f denotes a focal length of the whole of the optical system;
the method further comprising one of the following features (A) and (B):
(A) configuring the front group to comprise at least two convex-shaped air lenses, with one of the air lenses, which has a longest length on the optical axis, satisfying the following conditional expression:

$$-1.00 < (r2L1 + r1L1)/(r2L1 - r1L1) < 3.00$$

where r1L1 denotes a curvature radius of an object side lens surface of the air lens which has the longest length on the optical axis, and r2L1 denotes a curvature radius of an image side lens surface of the air lens which has the longest length on the optical axis;

(B) configuring the front group to comprise, in order from the object side, a first lens group and a second lens group, the first lens group consisting of two negative lenses and at least one positive lens, and the second lens group comprising three or more negative lenses; and satisfying the following conditional expression:

$$4.00 < -f1/f < 10.00$$

where f1 denotes a focal length of the first lens group.

20. An optical system comprising, in order from an object side, a front group having positive refractive power, and a rear group;

the front group being moved along the optical axis, upon carrying out focusing;

the front group comprising, in order from the object side, a first lens group and a second lens group;

the first lens group consisting of two negative lenses and at least one positive lens, and the second lens group comprising three or more negative lenses; and the following conditional expressions being satisfied:

$$0.90 < fF/f < 1.50$$

$$4.00 < -f1/f < 10.00$$

where fF denotes a focal length of the front group, f denotes a focal length of the whole of the optical system, and f1 denotes a focal length of the first lens group.

* * * * *